US011559944B2

(12) United States Patent
Zhou et al.

(10) Patent No.: US 11,559,944 B2
(45) Date of Patent: Jan. 24, 2023

(54) HIGH RESOLUTION ELECTROHYDRODYNAMIC THREE-DIMENSIONAL PRINTING OF HIGH VISCOSITY MATERIALS

(71) Applicant: Drexel University, Philadelphia, PA (US)

(72) Inventors: Gongyao Zhou, Wilmington, DE (US); Dajing Gao, Xi'an Shaanxi (CN)

(73) Assignee: Drexel University, Philadelphia, PA (US)

( * ) Notice: Subject to any disclaimer, the term of this patent is extended or adjusted under 35 U.S.C. 154(b) by 274 days.

(21) Appl. No.: 15/930,563

(22) Filed: May 13, 2020

(65) Prior Publication Data

US 2020/0361146 A1  Nov. 19, 2020

Related U.S. Application Data

(63) Continuation of application No. 62/847,040, filed on May 13, 2019.

(51) Int. Cl.
| | |
|---|---|
| *B33Y 10/00* | (2015.01) |
| *B33Y 30/00* | (2015.01) |
| *B41J 2/06* | (2006.01) |
| *B29C 64/295* | (2017.01) |
| *B29C 64/209* | (2017.01) |
| *B29C 64/118* | (2017.01) |
| *B41J 2/095* | (2006.01) |
| *B29C 64/364* | (2017.01) |

(52) U.S. Cl.
CPC .......... *B29C 64/209* (2017.08); *B29C 64/118* (2017.08); *B29C 64/295* (2017.08); *B41J 2/06* (2013.01); *B41J 2/095* (2013.01); *B29C 64/364* (2017.08); *B33Y 10/00* (2014.12); *B33Y 30/00* (2014.12)

(58) Field of Classification Search
CPC ... B29C 64/209; B29C 64/118; B29C 64/364; B29C 64/295; B41J 2/06; B41J 2/095; B33Y 10/00; B33Y 30/00
See application file for complete search history.

(56) References Cited

U.S. PATENT DOCUMENTS

| | | | | |
|---|---|---|---|---|
| 5,310,165 | A * | 5/1994 | Benz | B22F 9/082 222/603 |
| 2013/0000860 | A1* | 1/2013 | Hosek | B22F 3/115 164/514 |
| 2014/0322451 | A1* | 10/2014 | Barton | B41J 2/06 427/466 |
| 2018/0036729 | A1* | 2/2018 | Furtaw | G01N 27/44791 |

* cited by examiner

*Primary Examiner* — Yaovi M Ameh
(74) *Attorney, Agent, or Firm* — Joseph E. Maenner; Maenner & Associates, LLC

(57) ABSTRACT

A system and method for three-dimensionally printing high viscosity materials using electrohydrodynamics is provided. The system uses a relatively low voltage electric field to draw high viscosity polymers (not in solution) from a nozzle to form three-dimensional objects with lines less than 10 microns in width. Pressurized gas at the nozzle outlet can be used to print large size/dimension parts, instead of or in addition to the electric field to draw the polymers from the nozzle.

19 Claims, 23 Drawing Sheets

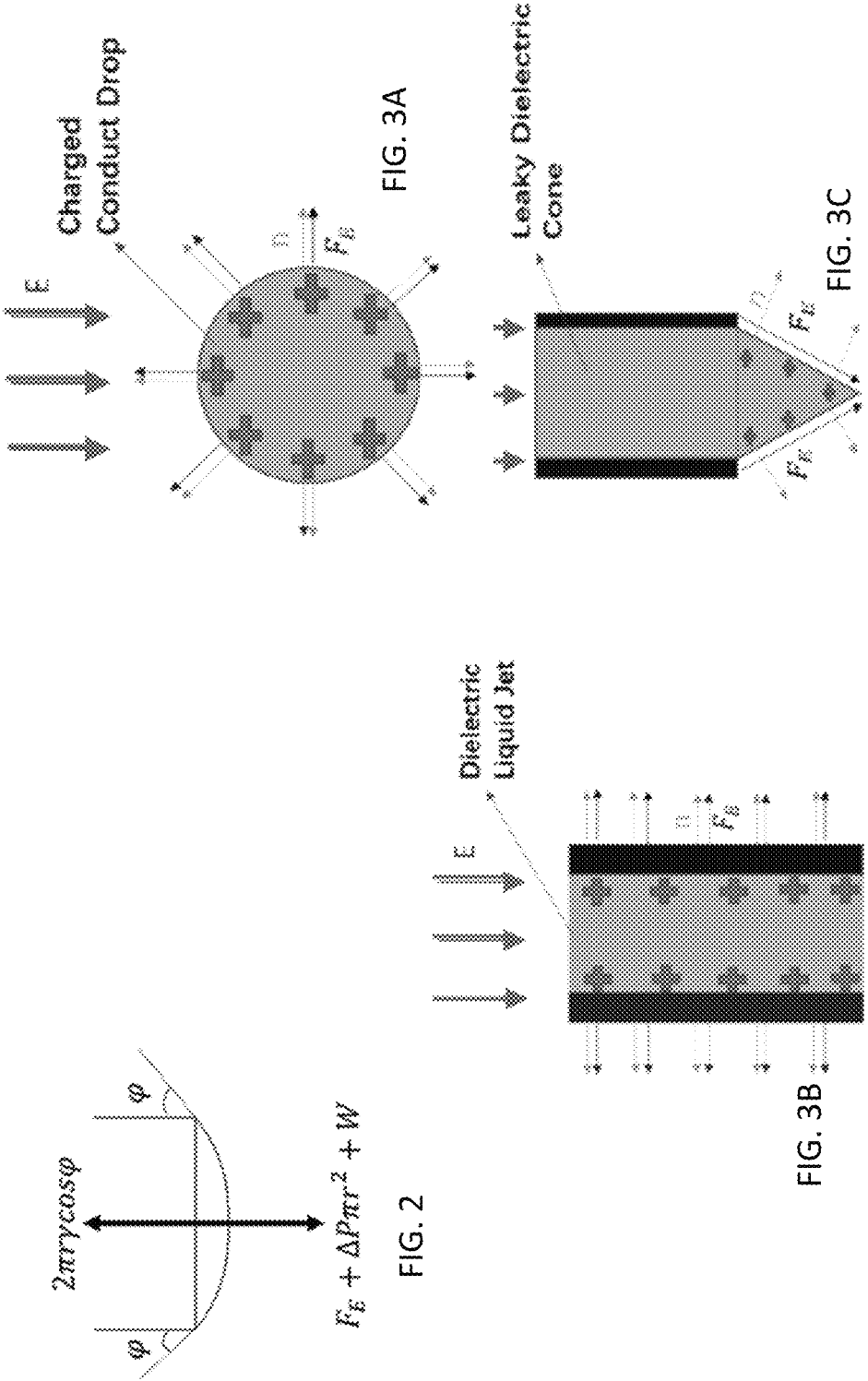

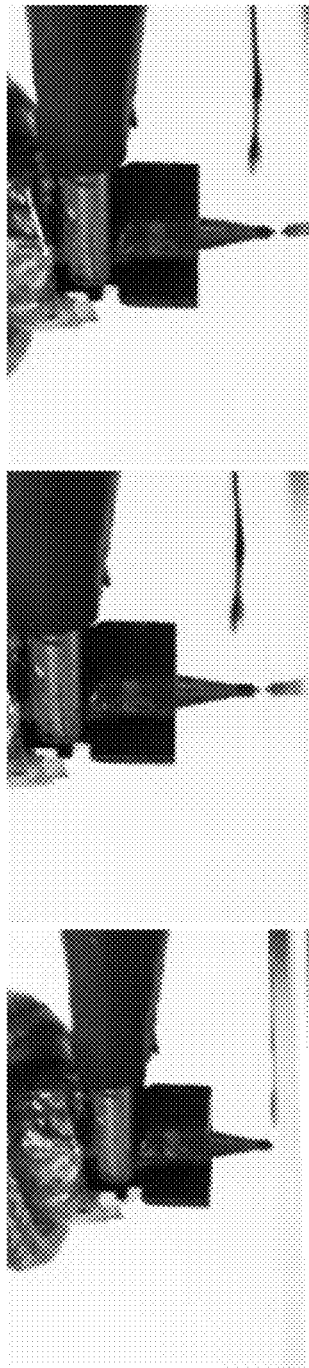
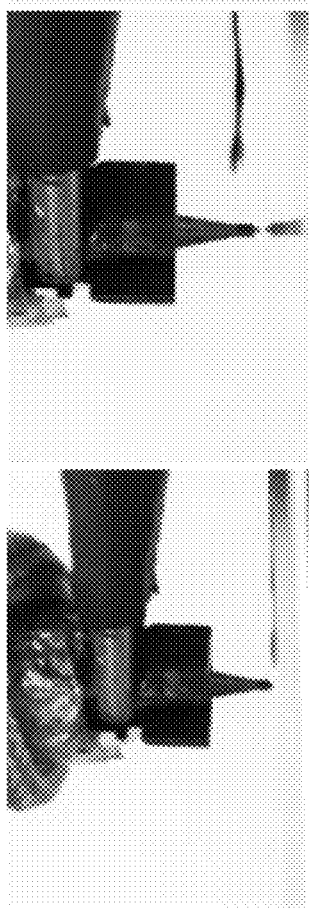
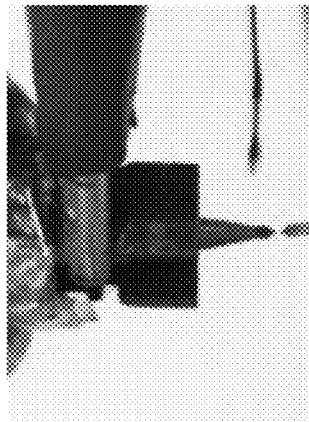
FIG. 8A  FIG. 8B  FIG. 8C  FIG. 8D  FIG. 8E  FIG. 8F

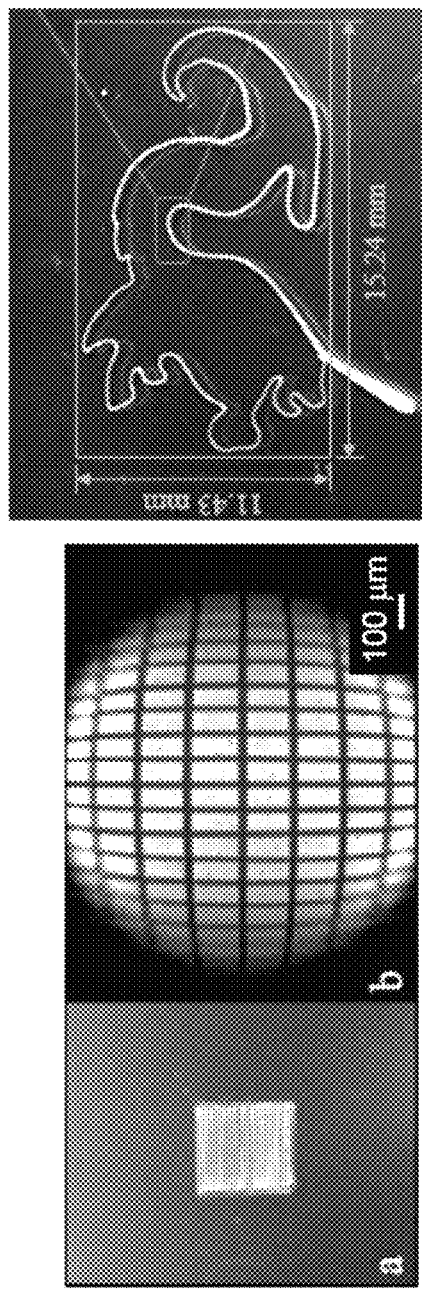
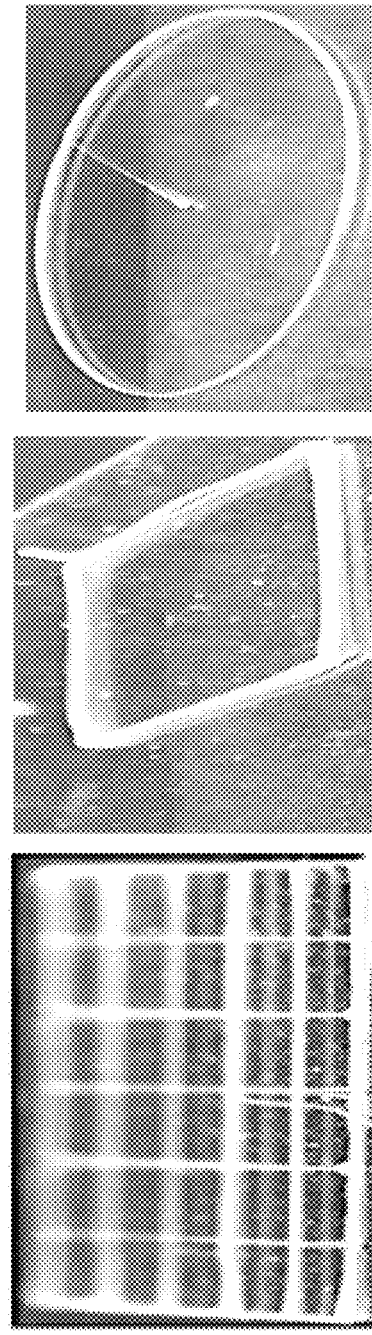
FIG. 9A  FIG. 9B  FIG. 9C  FIG. 9D  FIG. 9E  FIG. 9F

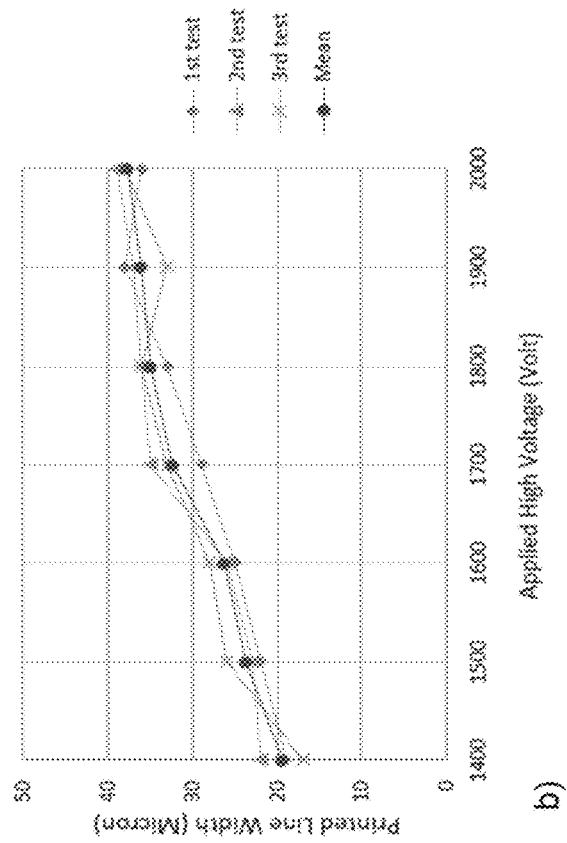
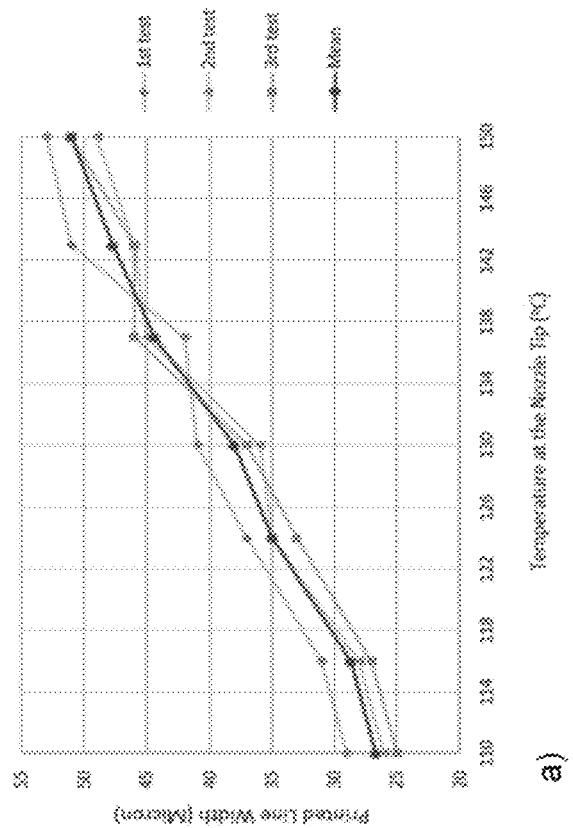
FIG. 10B
FIG. 10A

HIGH RESOLUTION ELECTROHYDRODYNAMIC THREE-DIMENSIONAL PRINTING OF HIGH VISCOSITY MATERIALS

BACKGROUND OF THE INVENTION

Field of the Invention

The present invention relates to a system and method of high resolution electrohydrodynamic three-dimensional printing of high viscosity materials.

Description of the Related Art

Compared to microelectromechanical systems, additive manufacturing ("AM") systems that rely on the localized delivery of materials directly to a substrate offer a solution to precise tissue engineering. AM techniques are able to build sophisticated and customized products during a short period of time, and offer significant advantages over traditional manufacturing processes in the areas of design freedom and reduction of assembly. AM processes involve making 3D solid objects from a digital CAD file, typically by laying down successive thin layers of material using materials such as polymers/plastics, rubbers, metals, composites, and ceramics. AM techniques have been developed for several decades, and they can be divided into two main categories based on their approaches: (1) direct deposition, which involves the direct transfer of liquid materials from a nozzle to a substrate, such as fused deposition modeling (FDM) and inkjet printing; and (2) pattern-a-pool, which utilizes a thin layer of liquid, powder, or slurry bed to selectively bind materials together using a laser or binder solution, such as selective laser sintering (SLS) (which uses a laser focus to sinter materials), and stereolithography (SLA) (which uses a laser focus to cure photopolymeric materials).

Inkjet printing offers advantages of low cost, high speed and large area processing, and has been applied to print graphics, organic transistors, organic and hybrid solar cells, electronic circuit boards, and biosensors. Inkjet printing relies on the generation of droplets at or near a nozzle aperture, followed by deposition on a substrate with high spatial control. The inkjet technology can be divided into thermal inkjet printing and piezoelectric inkjet printing. The thermal inkjet printer utilizes a heating element which causes an expansion of an air bubble used to squeeze the liquid out from the tip of the nozzle. The piezoelectric technology utilizes an applied voltage to a piezoelectric or ultrasound pressure transducer which generates a shape change of the liquid to form a droplet of liquid from the nozzle. All of these approaches share the same drawbacks that the droplet diameter is solely dependent on nozzle diameter, where the resulting droplet diameter is approximately double the size of the nozzle diameter.

There are two main reasons why the nozzle diameter cannot be scaled down easily. First, because of the high viscosity materials involved, a large driving power (generated by thermal or piezoelectric means) is required to force droplets from the nozzle, and even with low viscosity printing materials in conventional inkjet printers, it is difficult to raster linewidths less than 20 μm. Second, a relatively large nozzle diameter (~100 μm) is necessary to permit the pumping of viscous materials through the orifice. Currently, the minimum droplet diameter which can be produced is about 10-20 μm for low viscosity materials, and the resolution is further degraded by the spreading of droplets at high speeds onto the surfaces of substrates.

It would be beneficial to provide a system that can use electrohydrodynamics to three-dimensionally print high viscosity materials.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one embodiment, the present invention is an electrohydrodynamic 3D printing system comprising a reservoir having a discharge nozzle. The discharge nozzle has a distal tip. A heating coil is disposed proximate to the discharge nozzle. The heating coil is configured to heat the reservoir proximate to the discharge nozzle. A collector plate is located vertically below the distal tip a distance of not more than 1.5 mm. An electric potential supply has a first electrode electrically connected to the discharge nozzle and a second electrode electrically connected to the collector plate, wherein the electrical potential is less than 2 kV.

BRIEF DESCRIPTION OF THE DRAWINGS

The accompanying drawings, which are incorporated herein and constitute part of this specification, illustrate the presently preferred embodiments of the invention, and, together with the general description given above and the detailed description given below, serve to explain the features of the invention. In the drawings:

FIG. 2 is a schematic view showing force balance at the distal tip of a reservoir of the system of FIG. 1;

FIG. 3A is a schematic of the directions of the electric field, surface normal, and Coulombic force for a charged conducting sphere;

FIG. 3B is a schematic of the directions of the electric field, surface normal, and Coulombic force for a dielectric liquid jet;

FIG. 3C is a schematic of the directions of the electric field, surface normal, and Coulombic force for a leaky dielectric cone;

FIG. 8A is a photograph showing the time evolution of jet formation using the EHD 3D printer under 1.9 kV using PCI heated to 90° C., at the initial application of voltage;

FIG. 8B is a photograph showing the time evolution of jet formation using the EHD 3D printer under 1.9 kV using PCI heated to 90° C., where a cone shape appears at 6 s;

FIG. 8C is a photograph showing the time evolution of jet formation using the EHD 3D printer under 1.9 kV using PCI heated to 90° C., where cone shape increased at 14 s;

FIG. 8D is a photograph showing the time evolution of jet formation using the EHD 3D printer under 1.9 kV using PCI heated to 90° C., where the cone shape increased further at 19 s FIG. 8E is a photograph showing the time evolution of jet formation using the EHD 3D printer under 1.9 kV using PCI heated to 90° C., showing a cone-jet transition;

FIG. 8F is a photograph showing the time evolution of jet formation using the EHD 3D printer under 1.9 kV using PCI heated to 90° C., showing jetting to the substrate;

FIG. 9A shows a 10×10 mm$^2$ square array, including 100 printed lines using a nozzle temperature of 115° C., 1400 V, and 600 mm/min printing velocity;

FIG. 9B shows an optical micrograph of the square array showing a raster width of 20 micrometer;

FIG. 9C shows ~15×12 mm$^2$ Drexel Dragon logo, nozzle ID=0.8 mm, 70 micrometer raster width, printing time=2.3 min;

FIG. 9D shows a 24×19 mm square array with 16 layers, height=0.3 mm;

FIG. 9E shows a 30 layer rectangle structure height=570 micrometers;

FIG. 9F shows a 15 mm radius ring with 10 layers, thickness=190 micrometers;

FIG. 10A is a graph showing printed line width (microns) vs. nozzle tip temperature (° C.);

FIG. 10B is a graph showing printed line width (microns) vs. applied voltage (volts)

DETAILED DESCRIPTION

Figure 1:
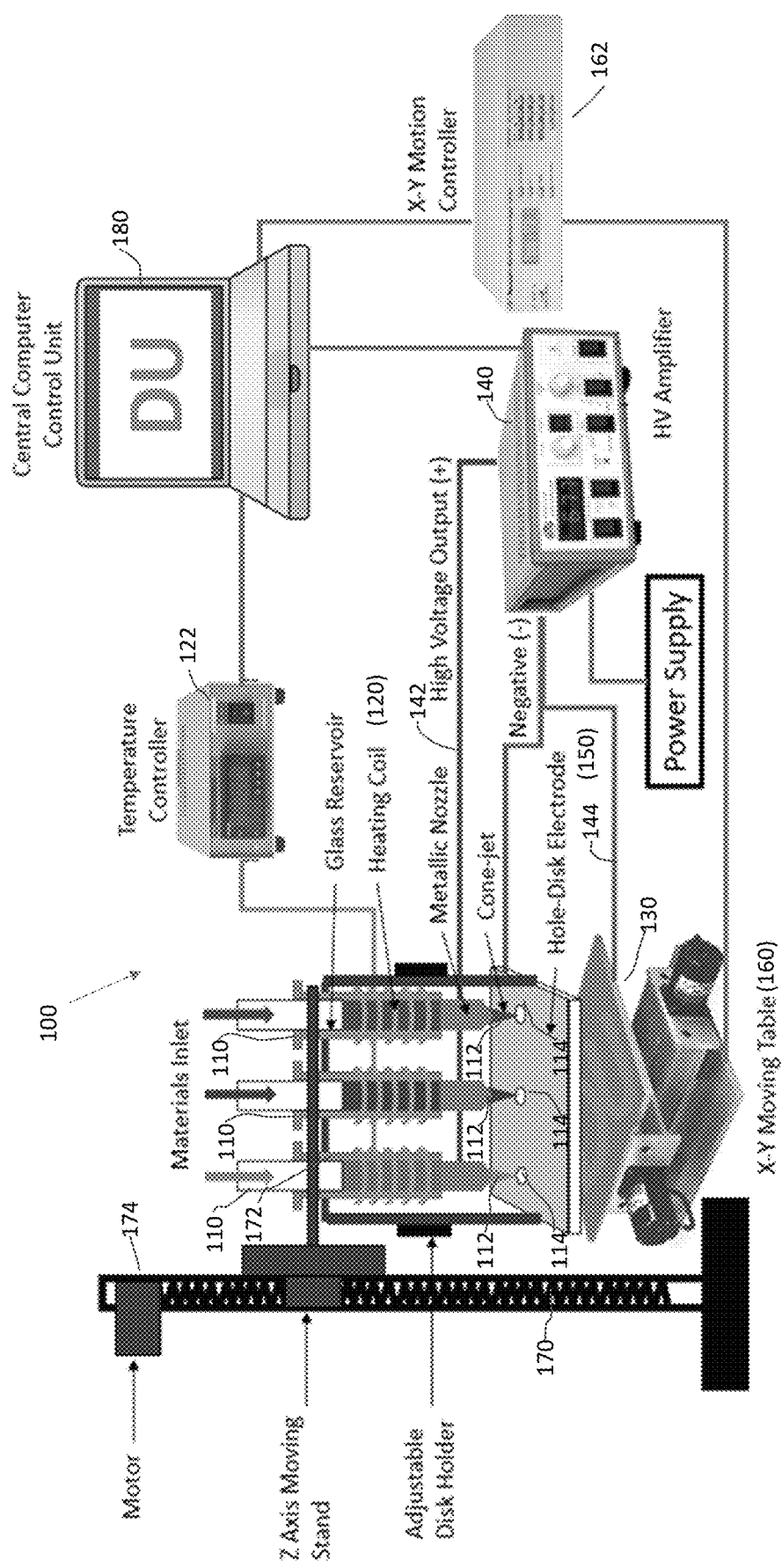
FIG. 1 is a schematic view of a multi-nozzle and multi-layer EHD printing system according to an exemplary embodiment of the present invention.

In the drawings, like numerals indicate like elements throughout. Certain terminology is used herein for convenience only and is not to be taken as a limitation on the present invention. The terminology includes the words specifically mentioned, derivatives thereof and words of similar import. The embodiments illustrated below are not intended to be exhaustive or to limit the invention to the precise form disclosed. These embodiments are chosen and described to best explain the principle of the invention and its application and practical use and to enable others skilled in the art to best utilize the invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

The word "about" is used herein to include a value of +/−10 percent of the numerical value modified by the word "about" and the word "generally" is used herein to mean "without regard to particulars or exceptions."

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Unless explicitly stated otherwise, each numerical value and range should be interpreted as being approximate as if the word "about" or "approximately" preceded the value of the value or range.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

The present invention provides an innovative electrohydrodynamic ("EHD") three-dimensional ("3D") printing extrusion assembly to overcome the current raster width limitations for high viscosity liquids, and increase the efficiency of printing. The present invention is developed based on the following steps: (1) understanding the basic principles of forming an electric field-driven jet, and developing strategies to accurately control jet stability; (2) modeling and numerical simulation of the system to identify optimized parameters associated with geometry, material properties, and printing processes; (3) developing a novel multi-nozzle and multilayer EHD printing system as shown in FIG. 1 by designing a high viscosity electrohydrodynamic printing system 100 with a fixed anode-cathode distance.

System 100 includes a reservoir 110 having a discharge nozzle 112 with a distal tip 114. In an exemplary embodiment, reservoir 110 can be constructed from a glass or other suitable material, while nozzle 112 is constructed from a metal. As shown in FIG. 1, the reservoir 110 uses a gravity feed, with no back pressure to force the print material from the reservoir 110.

A heating coil 120 is disposed proximate to the discharge nozzle 112 and is configured to heat the reservoir 110 proximate to the discharge nozzle 112. As shown in FIG. 1, more than one reservoir 110 can be provided, with heating coil 120 wrapper around each reservoir 110. The temperature of heating coil 120 is controlled by a temperature controller 122. Heating coil 120 is used to heat the printing material and, if the printing material is a solid, to melt the heating material in reservoir 110.

A collector plate 130 is located vertically below the distal tip 114 a distance of not more than 1.5 mm. A vertical distance between distal tip 114 of reservoir 110 and collector plate 130 can be adjusted by vertical mount 170. Reservoir 110 is attached to an arm 172 that moves vertically up and down a vertical support 174 to adjust the vertical distance between distal tip 114 of reservoir 110 and collector plate 130.

An electric potential supply 140 has a first electrode 142 electrically connected to the metal portion of discharge nozzle 112 and a second electrode 144 electrically connected to the collector plate 130. In an exemplary embodiment, an electrical potential generated by the electric potential supply is less than 2 kV.

The electric potential supply 140 generates an electric field at the discharge nozzle 112 to discharge printing material from the reservoir 110, through the discharge nozzle 112, and to the collector plate 130, such that the print material has a width of less than 10 microns. In an exemplary embodiment, the printing material is provided in the absence of a solution.

To obtain high resolution raster widths and uniform printing, it is important to understand cone formation and the associated critical parameters. The static force equilibrium equation is given as follows:

$$F_E + \Delta P \pi r^2 = 2\pi r \gamma \cos \varphi - W \quad (1)$$

where $F_E$ is the Coulomb force directed outward due to the applied electric field; $\Delta P$ is the pressure difference between the liquid cone at its base and the ambient pressure; $\gamma$ is the surface tension directed inward—which tends to minimize the interfacial energy; r is the nozzle radius; W is the weight of the liquid in the globular cap below the nozzle orifice, and $\varphi$ is the cone semi-vertical angle as shown in FIG. 2. The magnitude of the force $F_E$ exerted on a cylinder of length L is given by:

$$F_E = (V^2 L^2)/(4H^2) \times 1/(\ln(2L/r) - 3/2) \quad (2)$$

where V is voltage and H is the distance between the two electrodes. It is known that if the pressure difference at the top of the fluid equals zero, then the cone semi-vertical angle is 49.3°, and if the weight of the top of the liquid can be neglected, the critical voltage (where static equilibrium is no longer maintained) for the creation of a cone with a straight generatrix before the jet forms can be predicted by equation (3) (which is found by substituting equation (2) into equation (1)):

$$V = (2H/L) \times \sqrt{((\ln [2L/r] - 3/2)(2\pi r \gamma \cos(49.3°)))} \quad (3)$$

Above a critical voltage, static equilibrium can no longer be. For a liquid meniscus formed at the nozzle orifice as depicted in FIG. 2, the critical voltage can be approximately calculated as:

$$V_{critical} \approx \sqrt{((2\gamma r \cos \varphi)/\varepsilon_0) \times \ln(4l/r)} \quad (4)$$

where l is the distance between nozzle tip and substrate, and this expression is only valid when the electrode separation l>>r. This formula can only give an approximation to the required starting voltage (experimentally verified within 10%) for each experiment.

The transition between cone and jet is another important factor to consider. Various jetting modes are achieved by adjusting the parameters E and Q. When the electric field reaches or surpasses the critical electric field, a continuous jet is formed. The jet stream characteristics change with increasing E, and the equations for E and Q are as follows:

$$E = 4V/(d_N \ln(8H/d_N)), Q \approx (\pi d_N^4)/128 \, \mu L \times (\Delta P + \tfrac{1}{2}\varepsilon_0 E^2 - 4\gamma/d_N) \quad (5, 6)$$

A stable cone-jet transition will yield a jet with diameter D. The resulting jet diameter can be approximated by:

$$D_j \propto 1/E \times \sqrt{((\gamma D_n)/\varepsilon_0)} \quad (7)$$

where $\varepsilon_0$ is the permittivity of free space.

It is known that jetted weakly conducting materials conform to the leaky dielectric model if the following conditions are met: (1) the liquid is sufficiently conducting to carry electric charge only on its surface; (2) the liquid is sufficiently dielectric to polarize with an applied electric field; (3) the ambient fluid is assumed to have no effect on the jet except to provide a uniform external pressure.

The cone-jet has a well-defined interfacial boundary between the liquid and surrounding fluid (typically air). In FIGS. 3A-3C, the bisect rule is applied on a perfect conductor, a perfect dielectric, and a leaky dielectric. The figure shows that a leaky dielectric is necessary to support any tangential electric stress at the liquid-air interface. For a perfect conductor such as the charged sphere in FIG. 3A, the Coulombic force is always parallel to the surface normal. For the case of a perfect dielectric jet depicted in FIG. 3B, the force is also parallel to the surface normal. Lastly, for the case of a leaky dielectric with finite, non-zero conductivity and permittivity, a tangential shear stress can be developed as seen in the electrified cone pictured in FIG. 3C, where the applied electric field gives rise to a shear force along the conical surface.

The big advantage of EHD 3D printing is the large neck-down ratio produced from the cone-jet transition. Although unstable jet streaming plays an essential role in drop-on-demand applications, stable jet streaming is of fundamental importance in mass- and long-term production of droplets with a precisely controlled size, and thus stable jet streaming will be the focus of this research.

The top and bottom of the cone-jet are dominated by different forces, so jet stabilization will be researched separately for each. Generally, stable jetting requires a cusp-like or peak-ended liquid meniscus, which may be either stable or unstable depending on printer operational parameters. The globular stability of the liquid meniscus is a prerequisite for stable jetting, and the issued jet may either be convectively or absolutely stable, depending on its radius, velocity, and liquid material properties.

In conventional EHD 3D printers, the electric field changes as the number of printed layers increases. To overcome this limitation, FIG. 1 shows the inventive design to keep the anode at a fixed distance to the cathode to allow for consistent printing between successive layers.

It is difficult for conventional jet printing methods to deposit features below 100 µm due to the need for high pressures for liquid extrusion. Since the droplet size depends on nozzle diameter, it is a big challenge to make small enough nozzles to satisfy the requirements for single-micron raster widths using high viscosity materials. Additionally, using pressure to extrude high viscosity materials such as polycaprolactone ("PCL") or polylactic acid ("PLA") will consume a large amount of power, and can easily clog the nozzle. Typically, a viscosity greater than about 1,000 Pa-s is considered "high viscosity"; the inventive system can handle materials having viscosity of up to about $10^6$ Pa-s.

Among contemporary techniques for drop generation, EHD jetting may be the only technology that can reliably produce drops with dimensions an order of magnitude smaller than the nozzle orifice size.

In the EHD 3D printing process, an initially stable liquid meniscus stays nearly hemispherical as surface tension tends to minimize the interfacial energy. The pressure head of a liquid in a cylindrical nozzle can be adjusted by pressure regulator until the meniscus is approximately flat at the nozzle orifice. Increasing base pressure creates a slightly hemispherical liquid drop shape. At this stage, the liquid from the reservoir or syringe pump is electrically neutral, and the electric field in the conducting cylinder is zero, independent of the liquid conductivity. Therefore there is no charge separation in the nozzle, and the electrical neutrality of the liquid is maintained. For high viscosity materials like PCL or PLA that are solid at room temperature, providing heat to melt the materials causes the viscosity to change. According to equation (6), the relationship between temperature and the material viscosity will be a key point to explore in this research since they are directly related to the flow rate. When an electric field is introduced to a liquid droplet at the end of the nozzle, the separation of electric dipoles in the material will cause the meniscus to expand, but can still be considered as stable. Increasing the electric field can create a stable cone-jet; however the Taylor cone (the cone observed in electrospinning, electrospraying and hydrodynamic spray processes from which a jet of charged particles emanates above a threshold voltage) and associated semi-vertical angle is only valid in the limit of no liquid jet emission, as it does not account for changes in the EHD forces due to subsequent jet emissions. It has been found by others that the semi-vertical angle depends on flow rate and ambient pressure.

After the formation of the cone-jet, it is necessary to investigate the cone-jet stability and the effect of relevant parameters on cone-jet behavior to determine conditions for high resolution printing. Previous research shows that drop-on-demand is an accurate way to make droplets, and continuous production of droplets can produce a steady jetting of the liquid from the nozzle. Brownian motion (the random motion of particles suspended in a fluid resulting from their collision with the fast-moving molecules in the fluid) limits the stability of this type of jet, and it has been shown that jetted droplets typically deviate by 0.9 µm from the target position for a flight time of 1 ms.

Generally, the globular stability of the liquid meniscus is a prerequisite for stable jetting, and the stability of the meniscus depends on the printer operational parameters such as flow rate and applied voltage. Since viscous drag in the nozzle for high viscosity materials will reduce the supply rate of liquid to the cone according to the Poiseuille equation, and the loss rate of liquid is affected by the viscosity due to reduced conductivity, it is necessary to investigate the printer operating parameters needed for stable cone formation.

There are three ways to suppress instability and maintain a stable jet: (1) reducing the instability growth rate by manipulating the electric field in the jetting region; (2) decreasing the range of instability by decreasing the anode-cathode distance; (3) increasing the viscosity of the jetted liquid to damp the rate of instability growth. The first option is not recommended since the electric field required for cone-jet formation is around 105 V/m, and using a stabilizing electric field may cause air ionization, and an increase of both longitudinal and radial electric field components in the jet material, amplifying the sinuous modes of disturbances. For the second option, a small gap between anode and cathode can decrease the voltage requirement for the cone-jet transition and also suppress sinuous instability. This method would require a gap size on the order of 100 µm, which can easily be bridged by stray droplets. The third option is the most effective way to suppress instability, as increasing the viscosity of the material will reduce the radial electric field on the jet surface.

To determine the printing process parameters on jet diameter, a dimensional analysis was employed to determine the relationship of the dependence of jet diameter on the liquid material properties (mass density $\rho$, viscosity $\mu$, conductivity K, liquid-air surface tension $\gamma$, and relative permittivity $\varepsilon_r$), operating parameters (flow rate Q and electric field E), and geometrical parameters (nozzle diameter $D_n$, and anode-cathode distance H). There are eight variables plus the vacuum permittivity $\varepsilon_0$. To compare the dimensions of these parameters, the Buckingham's $\pi$-theorem can be applied:

$$D_j/D_0 = f(Q/Q_0, \varepsilon_r, (\mu D_0)/(\rho Q_0), V/[(\gamma d_0)/\varepsilon_0]^{0.5}, D_n/D_0, H/D_0) \quad (8)$$

where f is a dimensionless function;
$D_0 = [(\gamma \varepsilon_0^2)/(\rho K^2)]^{(1/3)}$ is the characteristic jet diameter; and
$Q_0 = (\gamma \varepsilon_0)/\rho K$ is the characteristic flow rate.

These dimensionless groups have a certain influence on jet diameter qualitatively, but the quantitative relationships need further investigation. In the dimensionless groups, the first is the dimensionless flow rate $\rho KQ/(\gamma \varepsilon_0)$, where for small flow rates, the jet diameter is proportional to the square root of the volumetric flow rate. The second dimensionless group is the relative permittivity, which is equal to $\varepsilon/\varepsilon_0$. The third group is the viscous dimensionless parameter which is equal to $((\rho \varepsilon_0 \gamma^2)/(K\mu^3))^{(1/3)}$, and may be interpreted as the ratio of characteristic velocity of the liquid $Q_0/D_0^2$ and the propagation velocity of a perturbation across the jet by viscous diffusion $\mu/(\rho D_0)$. The present invention focuses on high viscosity liquid materials, and the dimensionless viscosity parameter should be less than unity when the liquid conductivity is large. The dimensionless voltage $(E^2 \varepsilon_0)/(\gamma/d_0)$ may be interpreted as the ratio between the electrically-induced stress and the surface tension stress at the conical apex. Lastly, the ratios of nozzle diameter to characteristic jet diameter and anode-cathode distance to jet characteristic jet diameter can be manipulated directly if all other parameters are held constant.

Numerical and experimental studies were conducted on these relevant parameters to optimize the effect of electric field, material viscosity, and extruder geometry on the stability of the jet.

To understand, predict and control the EHD printing system, multi-physics modeling and finite element method (FEM) software COMSOL were used to study:

(1) the electric field strength versus extrusion system geometry;

(2) cone formation versus liquid pull-out force; and (3) jet stability versus applied voltage and identification of optimized printing parameters.

Figure 4:
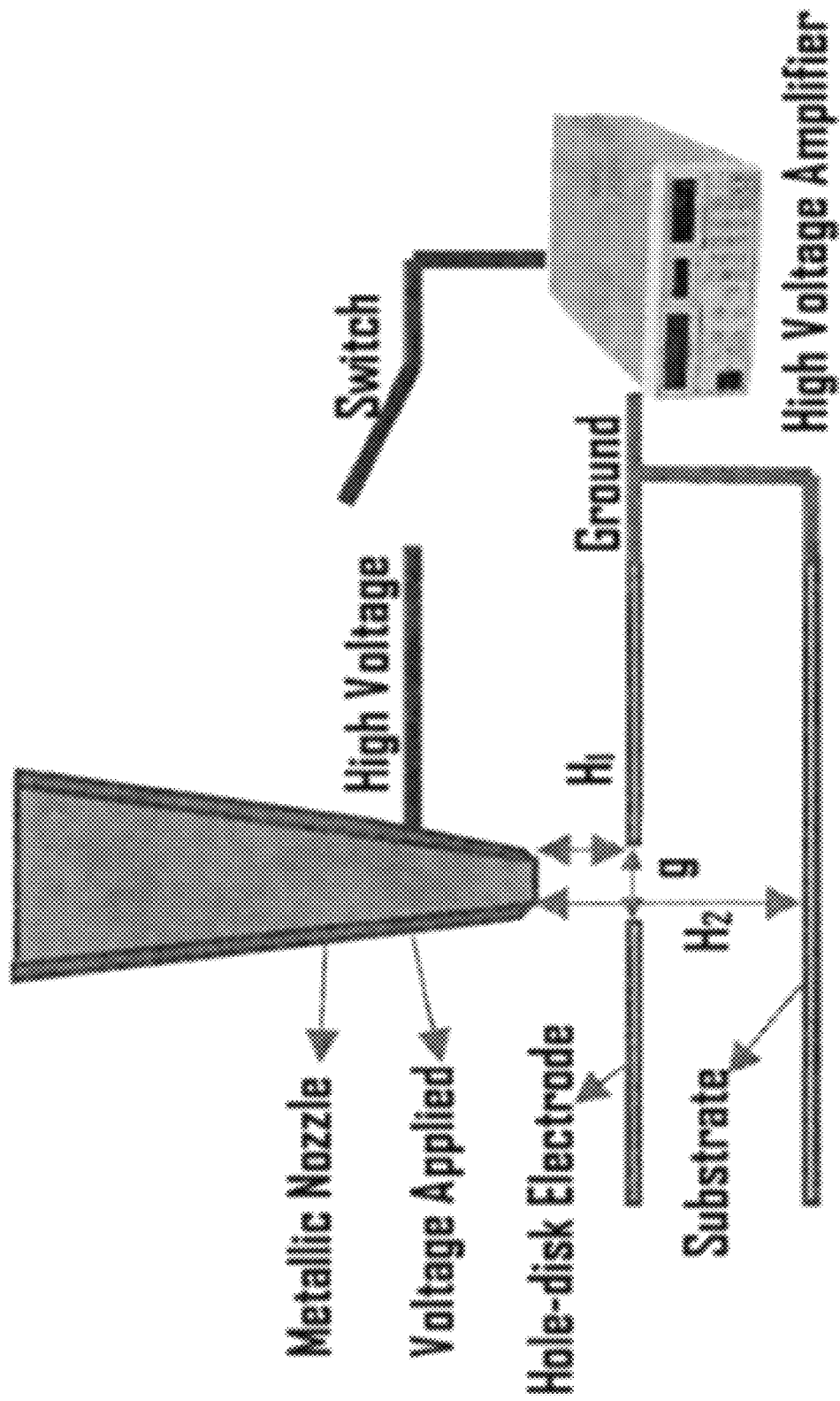
FIG. 4 is a schematic showing heights of the distal tip of the nozzle of FIG. 1 relative to the collector plate and a hole-disk electrode.

The CAD geometries used in simulation are shown in FIG. 4, where $H_1$ is the anode-cathode distance, $H_2$ is the anode-substrate distance, and g is the cathode hole diameter.

Figure 5A:
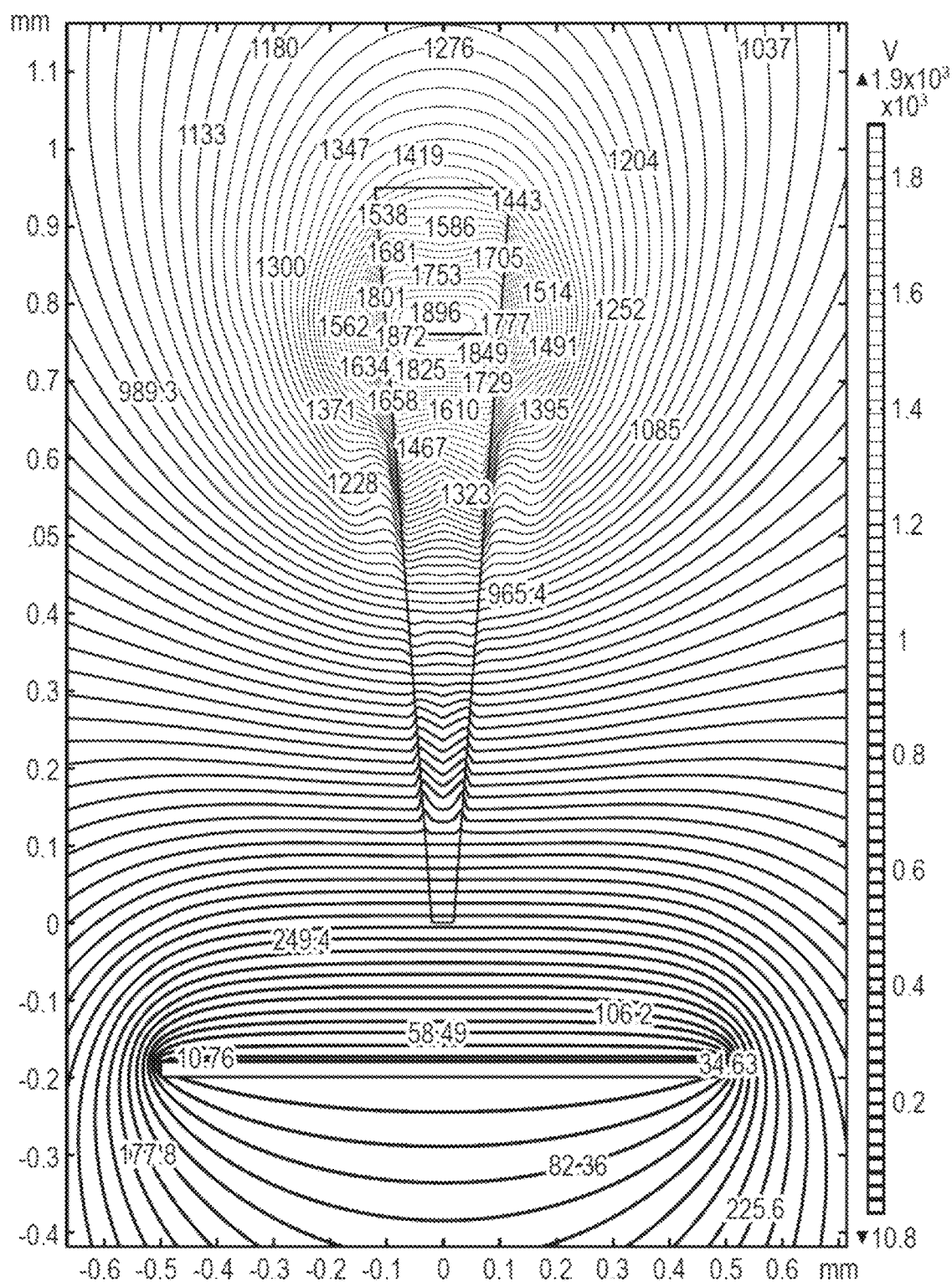
FIG. 5A is a graph of electric field distribution with an anode-substrate distance without the hole-disk electrode of FIG. 4 of 0.2 mm.
Figure 5B:
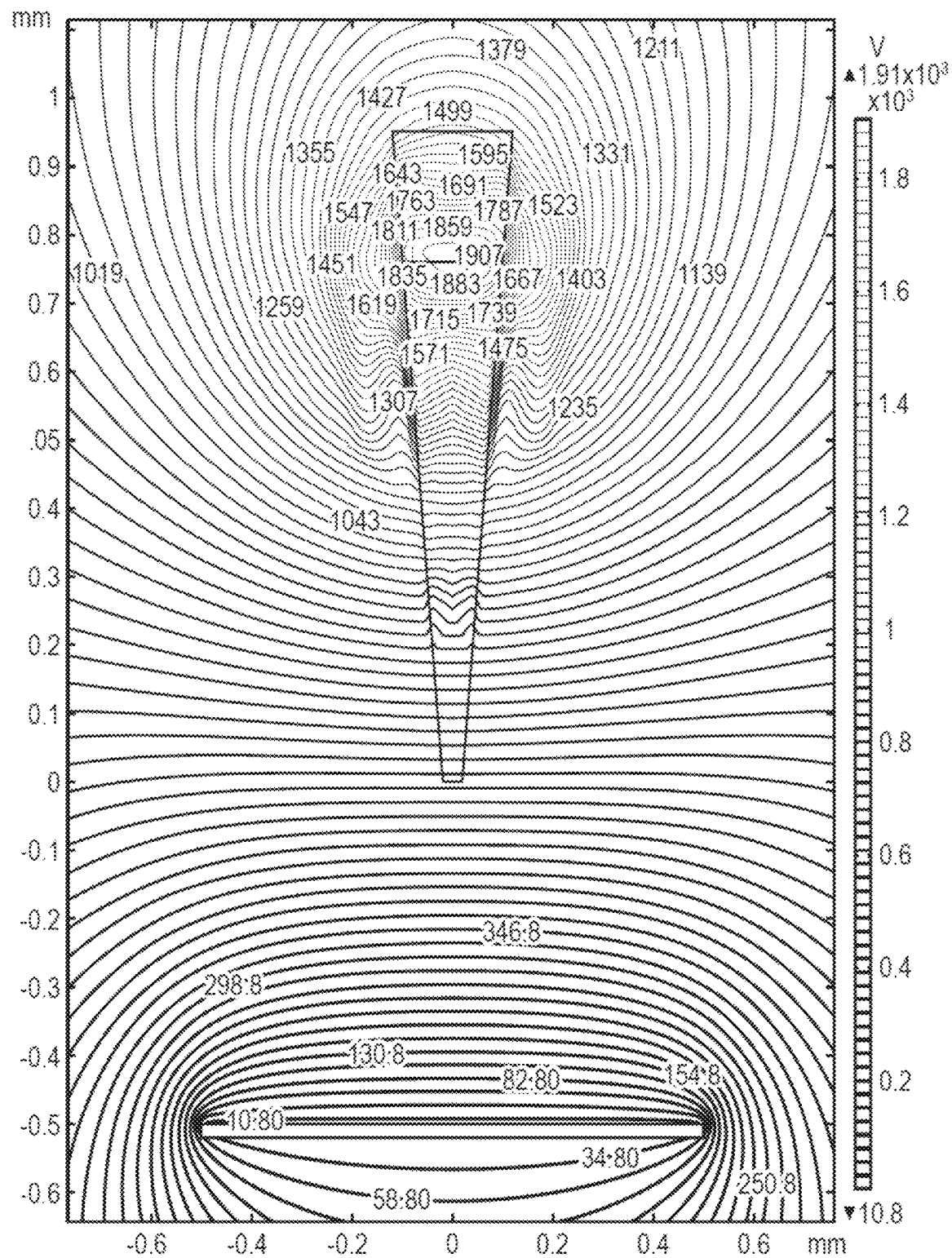
FIG. 5B is a graph of electric field distribution with an anode-substrate distance without the hole-disk electrode of FIG. 4 of 0.5 mm.
Figure 5C:
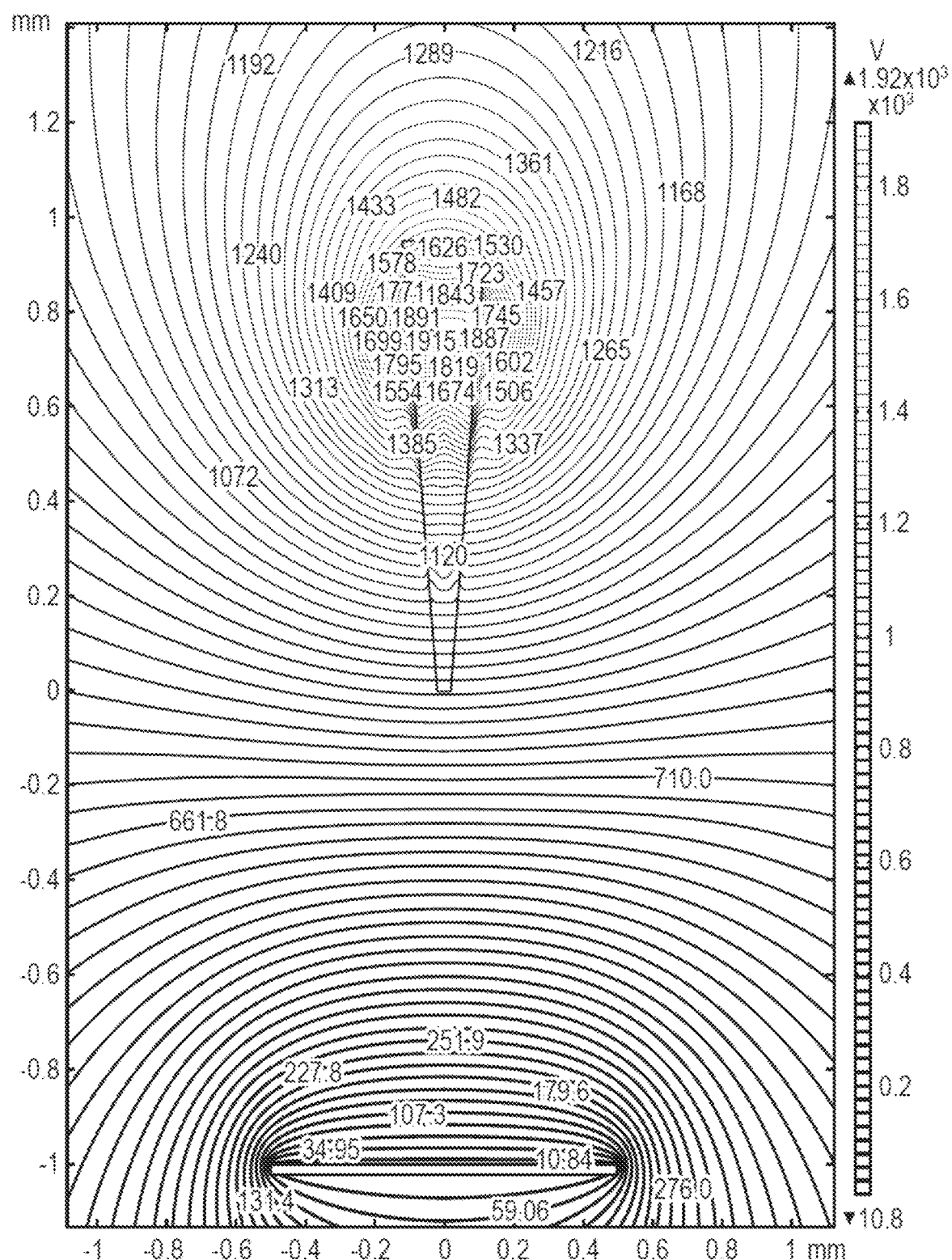
FIG. 5C is a graph of electric field distribution with an anode-substrate distance without the hole-disk electrode of FIG. 4 of 1 mm.
Figure 6A:
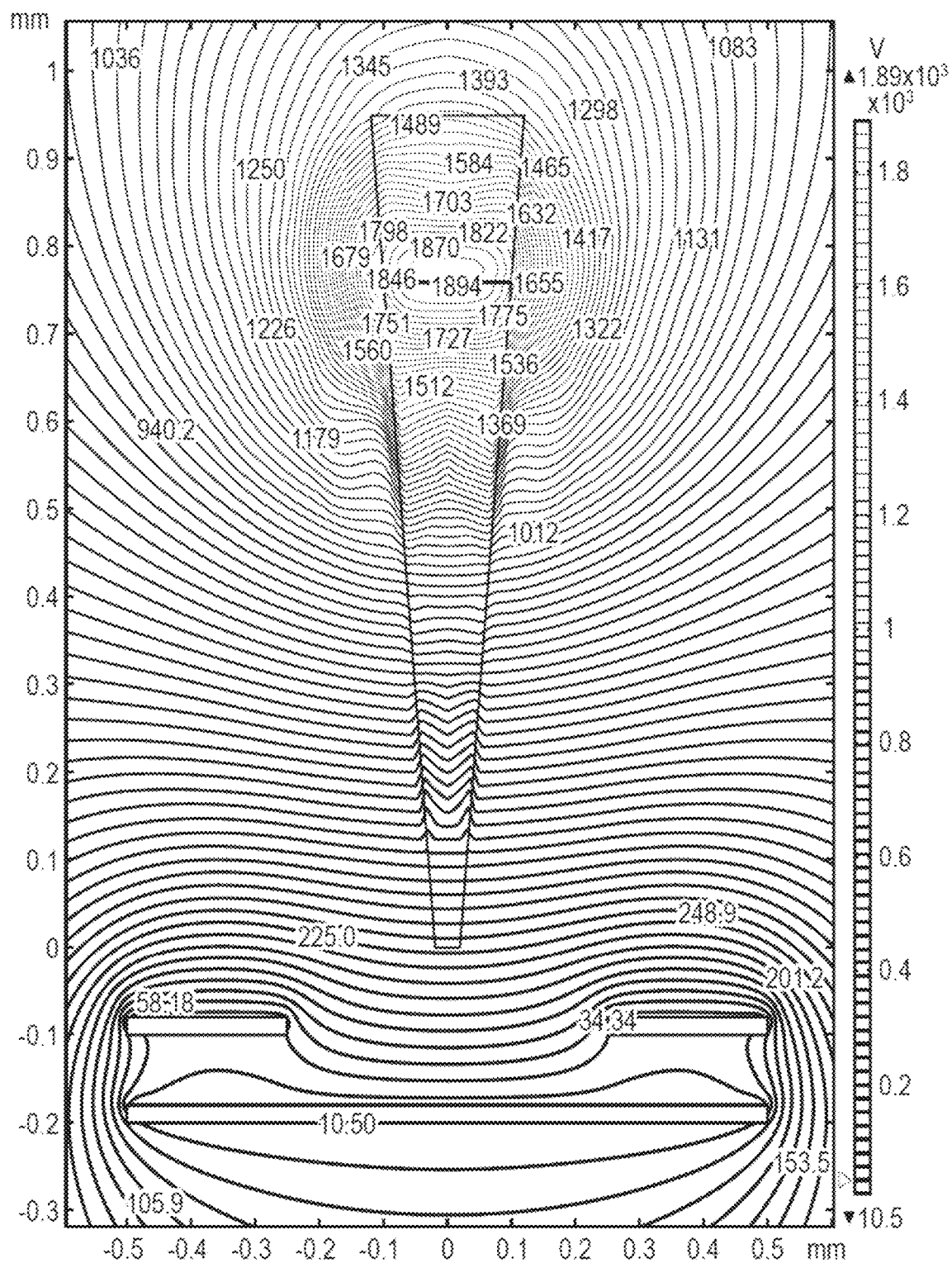
FIG. 6A is a graph of electric field distribution with an anode-substrate distance with the hole-disk electrode of FIG. 4 of 0.2 mm.
Figure 6B:
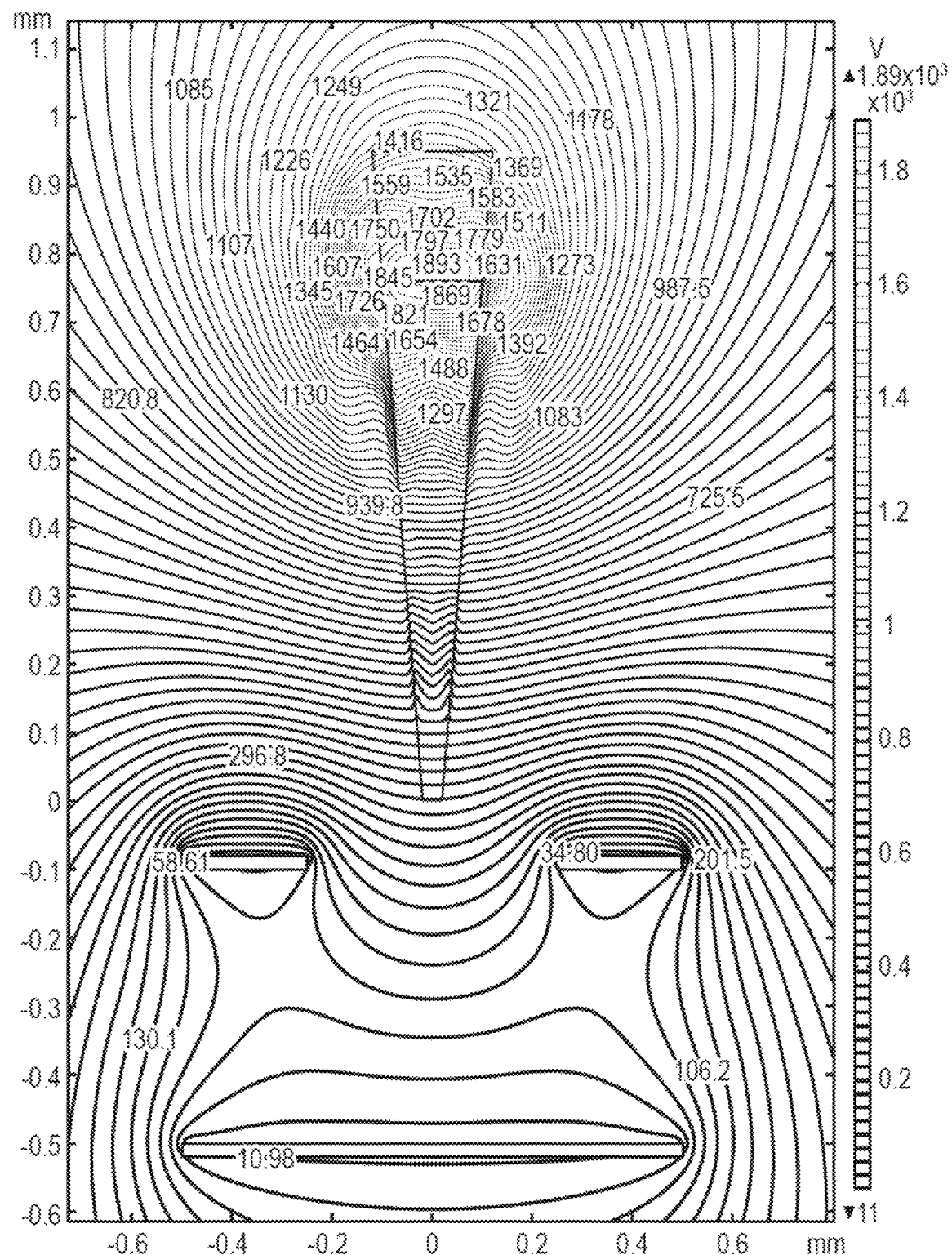
FIG. 6B is a graph of electric field distribution with an anode-substrate distance with the hole-disk electrode of FIG. 4 of 0.5 mm.
Figure 6C:
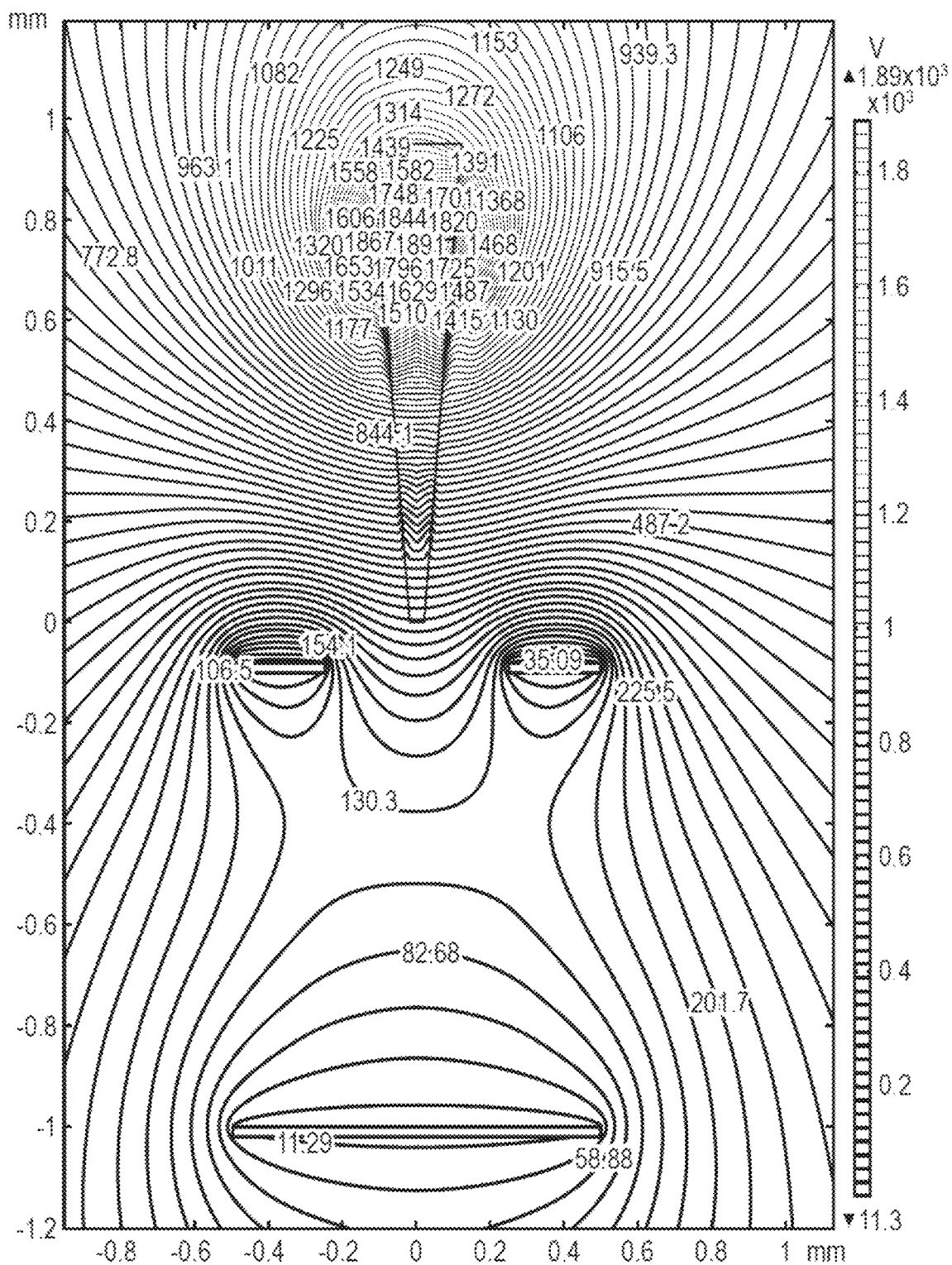
FIG. 6C is a graph of electric field distribution with an anode-substrate distance with the hole-disk electrode of FIG. 4 of 1 mm.

Initial investigations included a comparison of the electric field distribution in the extrusion assembly with and without the hole-disk electrode 150 (SHOWN IN FIG. 1). Material parameters input into the COMSOL environment were for PCL with air as the ambient environment. For molten PCL above 80° C., viscosity=6000-10000 Pa-s, surface tension coefficient=0.045 N/m, mass density=1145 kg/m³, conductivity=2.6e−5 S/m, and relative permittivity=3.5-4.5. FIGS. 5A, 5B, 5C show the electric potential distribution with labeled equipotential field lines for various anode-substrate distances for the configuration without the hole-disk electrode: a) $H_2$=0.2 mm, b) $H_2$=0.5 mm, and c) $H_2$=1 mm. The preliminary results presented in FIGS. 5A-5C verify that as $H_2$ increases without a hole-disk plate, then the electric field also decreases. By incorporating the hole-disk electrode, FIGS. 6A, 6B, 6C show that while the electric field still varies between the anode and substrate, the electric field distribution around the anode and hole-disk electrode remains constant for the same values of anode-substrate distances.

Figure 7A:
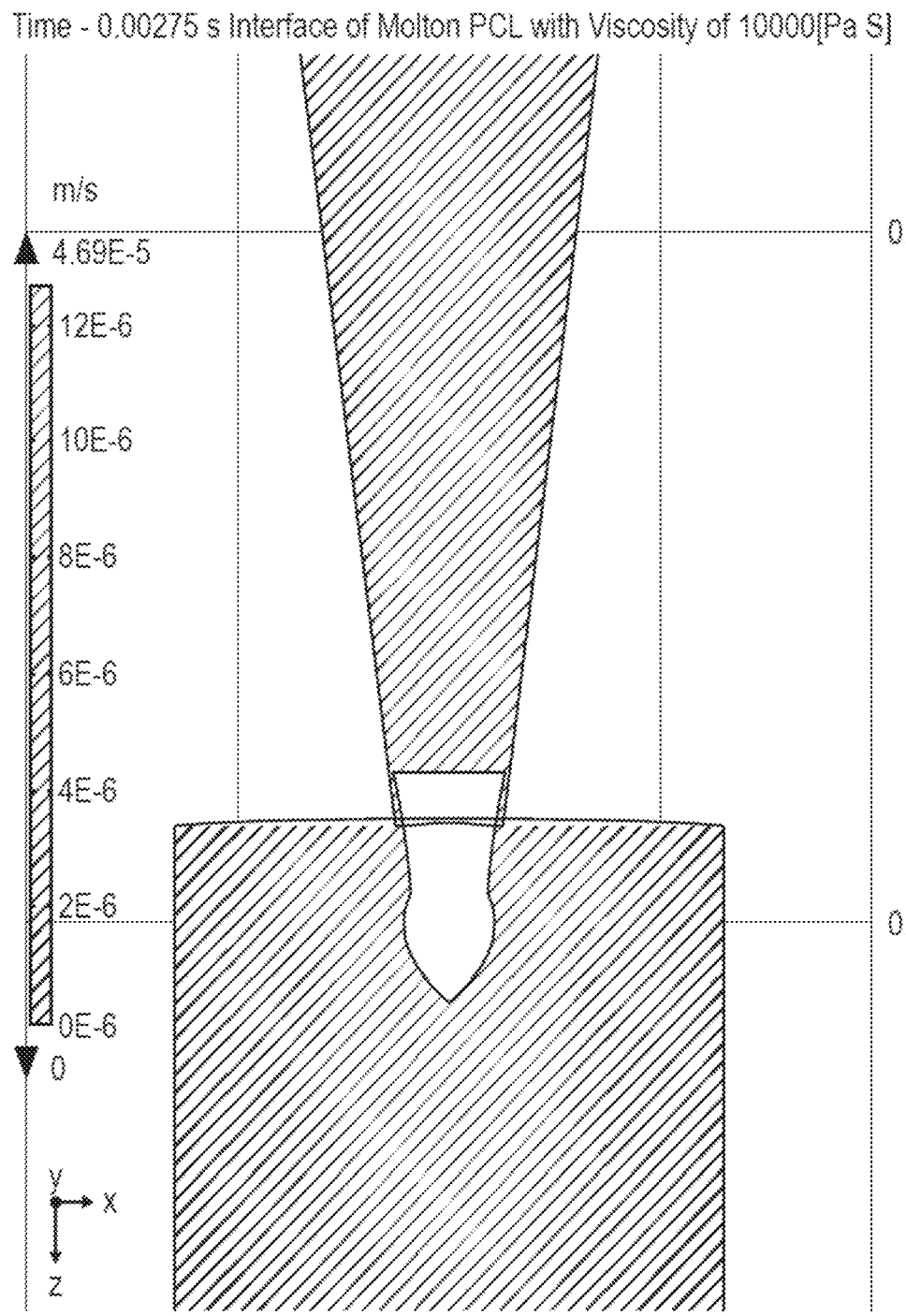
FIG. 7A is a simulation of a Taylor cone formation with an applied voltage of 900 volts.
Figure 7B:
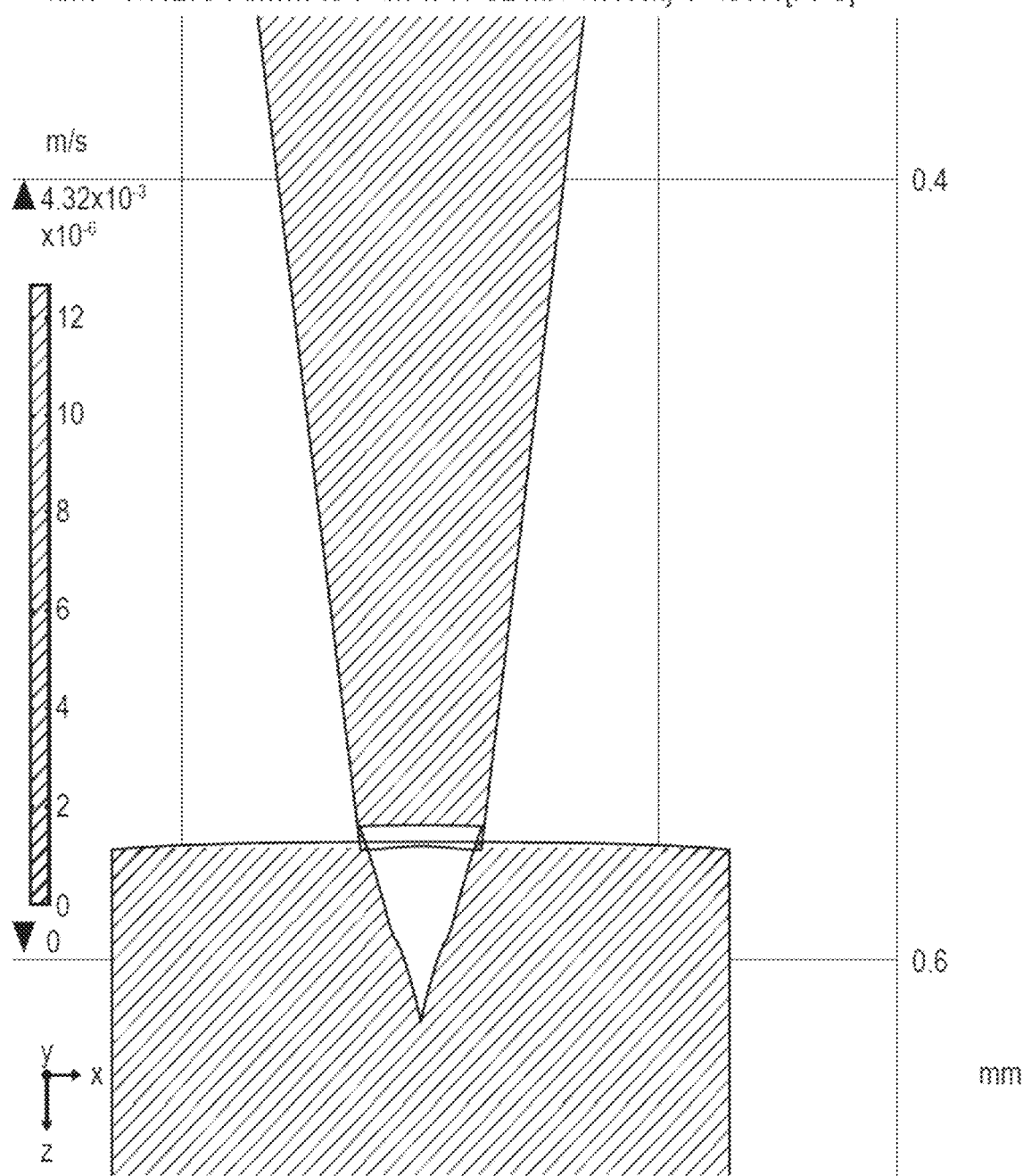
FIG. 7B is a simulation of a Taylor cone formation with an applied voltage of 1500 volts.
Figure 7C:
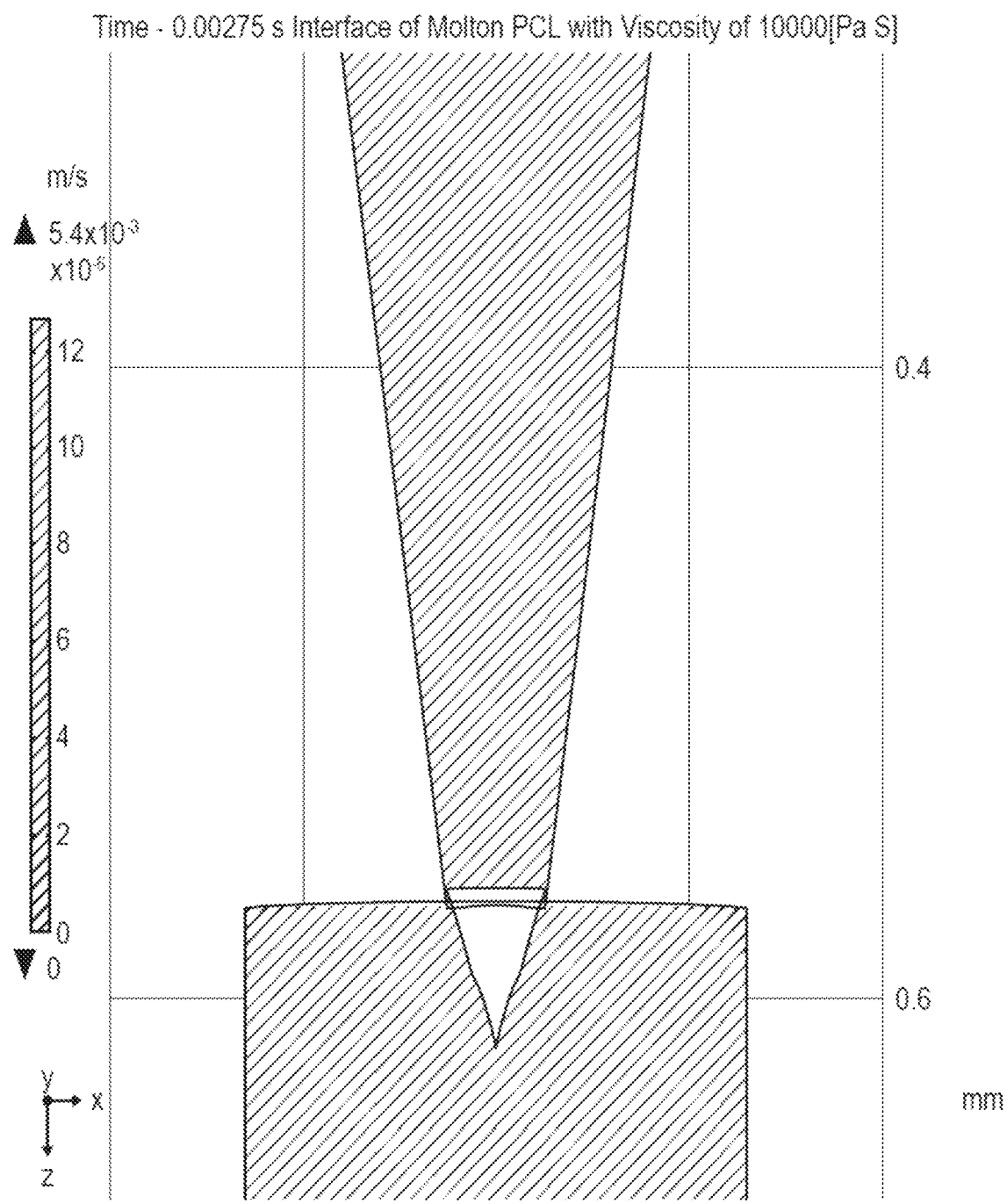
FIG. 7C is a simulation of a Taylor cone formation with an applied voltage of 2000 volts.

COMSOL can also simulate fluid flow using computational fluid dynamics ("CFD"). Preliminary tests using the CFD feature showed that the Taylor cone can be formed when geometrical, material, and applied voltage parameters are chosen carefully. In FIGS. 7A, 7B, 7C it can be found in FIG. 7A that V=900V is not sufficient enough to form a cone jet, in FIG. 7B that V=1500V and in FIG. 7C that V=2000V are able to form the cone jets; and the higher the V is, the thinner the cone tip will be. These early results show that for a configuration without the hole-disk electrode, Taylor cone formation is possible and the COMSOL system can model this phenomenon.

Further numerical analysis is required to evaluate the geometrical parameters $H_1$, $H_2$, and g. Parametric optimization will be used to identify the dimensions of these parameters at a constant voltage. Once the optimal geometrical parameters have be elucidated, cone formation studies using CFD will be performed at various material properties to define the parameter space for printing a variety of materials. Lastly, the large parameter space will be identified for jet stability for all printing parameters (viscosity, nozzle temperature, and XY table velocity).

The EHD printer can print materials with different fluid properties in order to satisfy the variety of requirements for microstructure fabrication. Multiple nozzles can share the same power supply since the EHD 3D printer relies on the applied electric field and not a mechanically applied back pressure. As discussed previously, the proposed design can print multilayered structures composed of different materials in high resolution.

Many 3D printing applications require multiple materials to be deposited simultaneously. It is not possible for FDM or laser-based printing systems to deposit different-sized ligaments using the same nozzle or constant laser spot size. EHD 3D printing, however, offers a system with adjustable operating parameters such as voltage, heating temperature and printing velocity to dynamically print different size droplets or jets. The EHD 3D printed structures and support materials can be printed simultaneously, and the design shown in FIG. 1 was constructed to meet these requirements.

The design presented in FIG. 1 was constructed to satisfy the requirements of high resolution EHD 3D printing. The hole-disk electrode 150 can be fabricated using laser cutting, which can make holes with diameters on the order of 25 µm and produces sharp, accurate features. The fabricated electrode 142 is attached in an adjustable configuration to the printing nozzle 112 and aligned with distal tip 114. During initial Taylor cone formation at the onset of printing, some jetting liquid may scatter, so a deflection plate and material recycle reservoir can also be added to the system 100 to catch stray droplets. Once a stable cone is formed, this reservoir may be removed.

FIG. 1 shows a schematic of the system 100 which has been built using a glass syringe as reservoir 110 with metal nozzle 112 to dispense liquid printing materials. Using a CAD .stl file, slicing software is used to generate G-code necessary to navigate the printer nozzle tool path and XY stage (substrate). Printer control software reads the G-code and transfers commands to the 3D printer. System 100 currently has the following capabilities: high resolution ($D_j \leq 20$ µm); high neck-down ratio ($10 \leq D\_n/D_j \leq 20$); can print a wide variety of materials (most liquids, wax, polymers such as PCL and PLA, colloidal suspensions, and ceramics; can print high viscosity materials ($\mu$>3e6 cP); no back pressure required; machine is simple and compact; low cost and environmentally friendly. The reservoir 110 is fitted with a metal luer lock used as a reservoir for jetting material, and a standard stainless steel printing nozzle with 120 µm inner diameter is affixed to the luer lock. The reservoir 110 is held at a constant height during the printing process (10-30 cm above the nozzle 112) to approximately balance the surface tension to achieve a flat meniscus. The metal nozzle 112 is treated with a hydrophobic coating to keep liquid from wetting the inner surface of the nozzle 112 in order to improve the reliability of producing the cone-jet transition. The metal nozzle 112 was connected with the positive pole 142 of electric potential supply 140, which can be a high voltage amplifier (Trek 677B), and the collector plate (metal substrate) 130 which sits on a moving XY stage 160 is connected to the negative pole 142 of the amplifier. XY stage 160 is controlled by an XY-motion controller 162.

A central controller 180 is electronically connected to temperature controller 122, electric potential supply 140, and XY-motion controller 162 to enable central control of system 100.

The maximum output of the power supply is 2 kV, and the high voltage is mostly required to overcome the surface tension of the high viscosity materials to be printed. Using this system air ionization has not been a problem, although the electrical breakdown of air may occur locally at the nozzle tip at higher voltages. Some polymers such as PCL and PLA are solid at room temperature and are thus heated before extrusion. An Omega thermocouple is used in conjunction with a temperature controller, and heat tape is wrapped around the glass syringe to control the temperature. Material properties can also be measured in situ: using a digital Brookfield viscometer to measure viscosity, and a Kruss digital tensiometer to measure surface tension using the Wilhelmy method, and electrical conductivity of the liquid measured by the resistance of the liquid-filled Tygon tubes.

FIGS. 8A-8F show the time evolution of jet formation using the EHD 3D printer under 1.9 kV using PCL heated to 90° C., where FIG. 8A shows the initial application of voltage, FIG. 8B shows that a cone shape appears at 6 s, FIG. 8C shows that the cone shape increased at 14 s, FIG. 8D shows that the cone shape increased further at 19 s, FIG. 8E shows a cone-jet transition, and FIG. 8F shows jetting to the substrate. To demonstrate the advantages and capabilities of this system, numerous tests and analysis have been performed. In FIGS. 9A-9F, all printed samples were made from PCL, and the pictured samples are: FIG. 9A—10×10 mm² square array, including 100 printed lines using a nozzle temperature of 115° C., 1400 V, and 600 mm/min printing velocity; FIG. 9B—optical micrograph of the square array showing a raster width of 20 µm; FIG. 9C ~15×12 mm² Drexel Dragon logo, nozzle ID=0.8 mm, 70 µm raster width, printing time=2.3 min; FIG. 9D—24×19 mm square array with 16 layers, thickness=0.3 mm; FIG. 9E—30 layer rectangle structure; and FIG. 9F—15 mm radius ring with 10 layers, thickness=190 µm.

To demonstrate how the printer control parameters improve the EHD printing resolution and efficiency, tests were performed to find relationships between raster widths versus temperature at the nozzle tip, raster width versus applied voltage, and raster width versus XY stage velocity. FIG. 10A shows the experimental results comparing raster width to nozzle tip temperature. From this figure it can be seen that the printing temperature has a significant influence on raster width. As temperature increases from 110-150° C., the raster width increases from 27 to 52 µm, revealing a nearly linear relationship. The XY stage velocity was 75 mm/min and the voltage was 1900 V for these experimental results. FIG. 10B shows the experimental results which compare raster width with applied voltage. From this figure it can be seen that the applied voltage also has a nearly linear relationship, as a voltage increase from 1400-2000 V corresponded to raster widths ranging from 20-38 µm respectively. The nozzle temperature was 140° C. and XY stage velocity was 100 mm/min.

Figure 11:
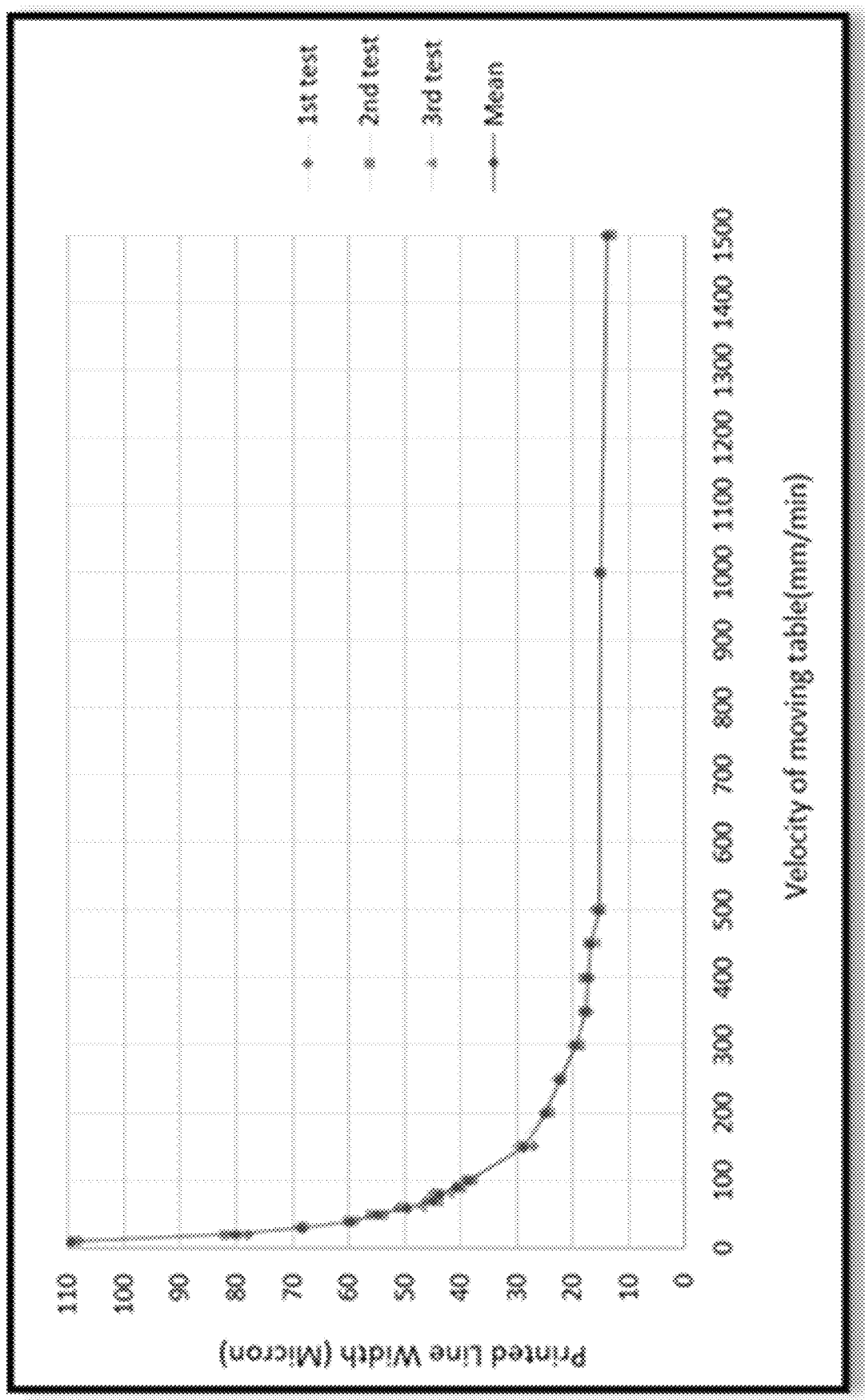
FIG. 11 is a graph showing printed line width (microns) vs. velocity of moving table (mm/min)
Figures 11A, 11B:
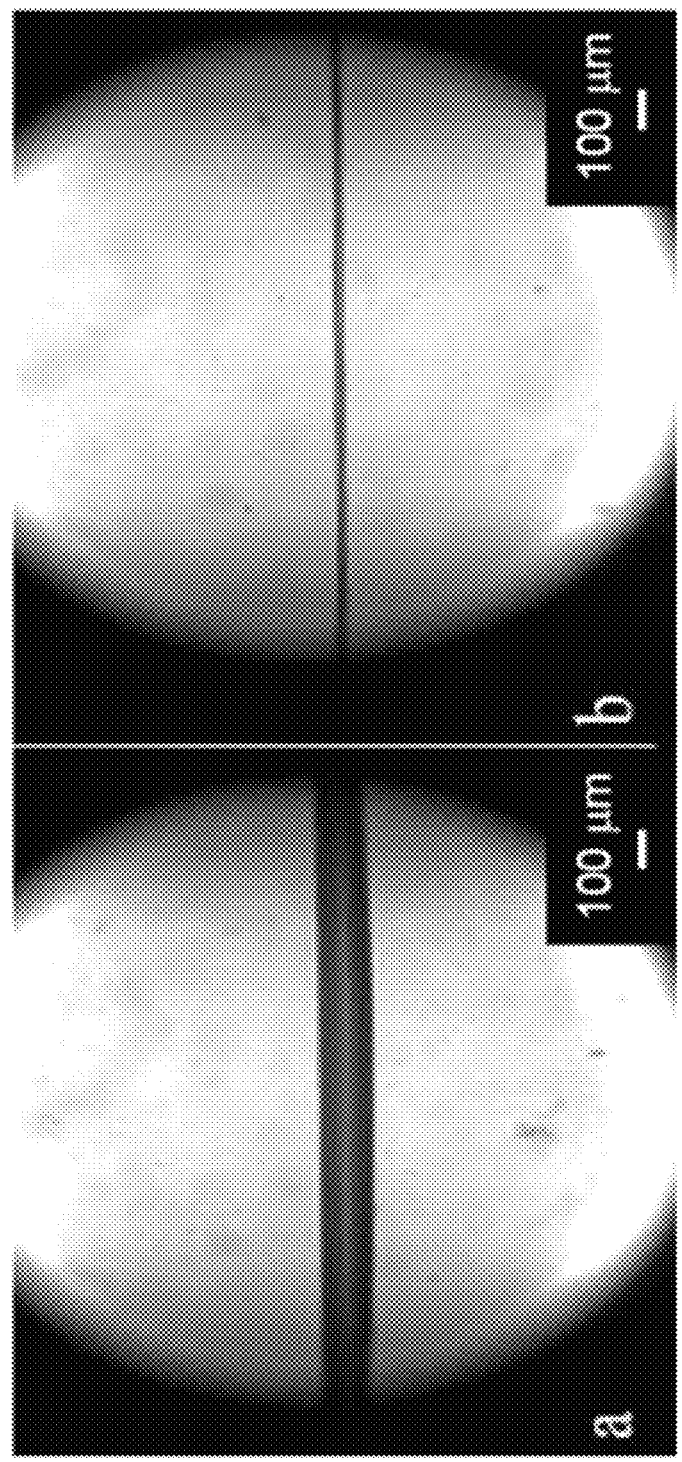
FIG. 11A is a photograph showing the width of a printed line with an XY stage velocity of 10 mm/min.
FIG. 11B is a photograph showing the width of a printed line with an XY stage velocity of 1500 mm/min.
Figures 12A, 12B, 12C, 12D, 12E, 12F, 12G:
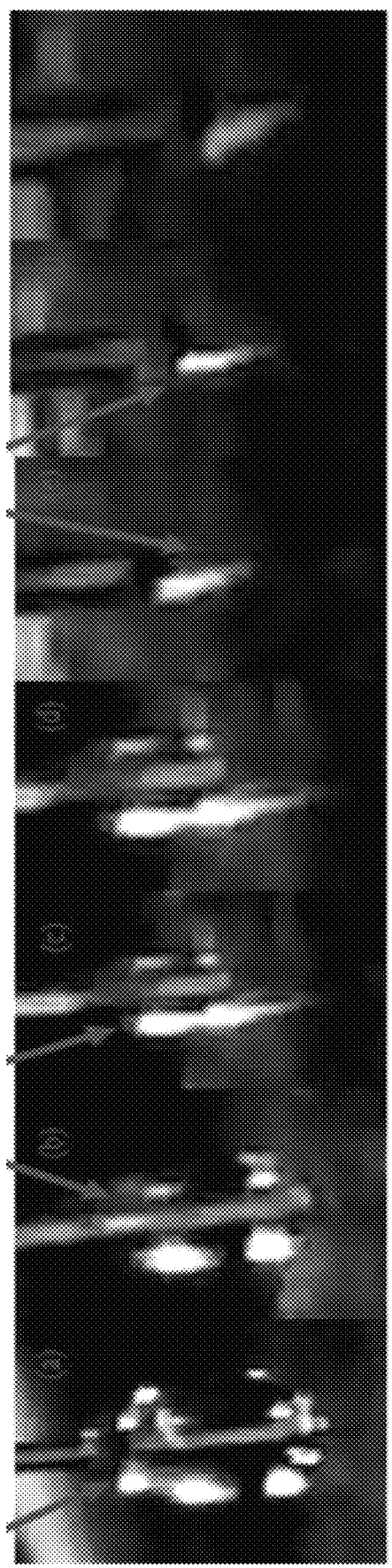
FIG. 12A is photograph showing the shape of printing material at the discharge end of the nozzle of the present invention with an applied voltage of 100V.
FIG. 12B is photograph showing the shape of printing material at the discharge end of the nozzle of the present invention with an applied voltage of 900V.
FIG. 12C is photograph showing the shape of printing material at the discharge end of the nozzle of the present invention with an applied voltage of 1200V.
FIG. 12D is photograph showing the shape of printing material at the discharge end of the nozzle of the present invention with an increasing applied voltage of 1250V.
FIG. 12E is photograph showing the shape of printing material at the discharge end of the nozzle of the present invention with an increasing applied voltage of 1300V.
FIG. 12F is photograph showing the shape of printing material at the discharge end of the nozzle of the present invention with a decreasing applied voltage of 1250V.
FIG. 12G is photograph showing the shape of printing material at the discharge end of the nozzle of the present invention with a decreasing applied voltage of 1300V.

The influence of the speed of the XY stage on raster width was also evaluated. FIG. 11 shows the comparison of printed raster width with XY stage velocity, showing a dramatic exponential decay as velocity is increased from 1 to 1500 mm/min, the raster width decreased from 109-14 µm. The inset figure in FIGS. 11A and 11B shows optical micrographs obtained during the 1st series of tests: a) 10 mm/min XY stage velocity, raster width=108 µm; b) 1500 mm/min XY stage velocity, raster width=14 µm, where the nozzle temperature for the 1st series of tests was 140° C., and the applied voltage=1900 V. From these results, it can be concluded that XY stage velocity, nozzle temperature, and applied voltage are key printing parameters for the EHD 3D printing system.

System 200 was used to change the shape and size of the liquid cone discharged from chamber 210 in response to different electrical voltage. Since resolution and magnification of camera is low, a nozzle whose outer diameter is 0.91 mm was selected in order to take pictures for shape changes of liquid cone. FIGS. 12A-12G show that deformation of cone shape and formation of cone-jet with increase of voltage. The size of droplet is reduced with the growth of voltage from 100 volts to 1300 volts as seen in FIG. 12A through FIG. 12E. Second, a hysteresis phenomenon was observed from FIGS. 12D and 12F when value of voltage is 1250 volts. As voltage decreases from 1300 volts (FIG. 12E) to 1250 volts, an obvious cone shape is formed in FIG. 12G. However, the cone shape did not apparently exist at 1250 volts, as value of voltage increased from 1200 volts to 1250 volts. Third, the critical voltage for the formation of cone-jet is around 1270 volts after multiple tests.

Figure 13:
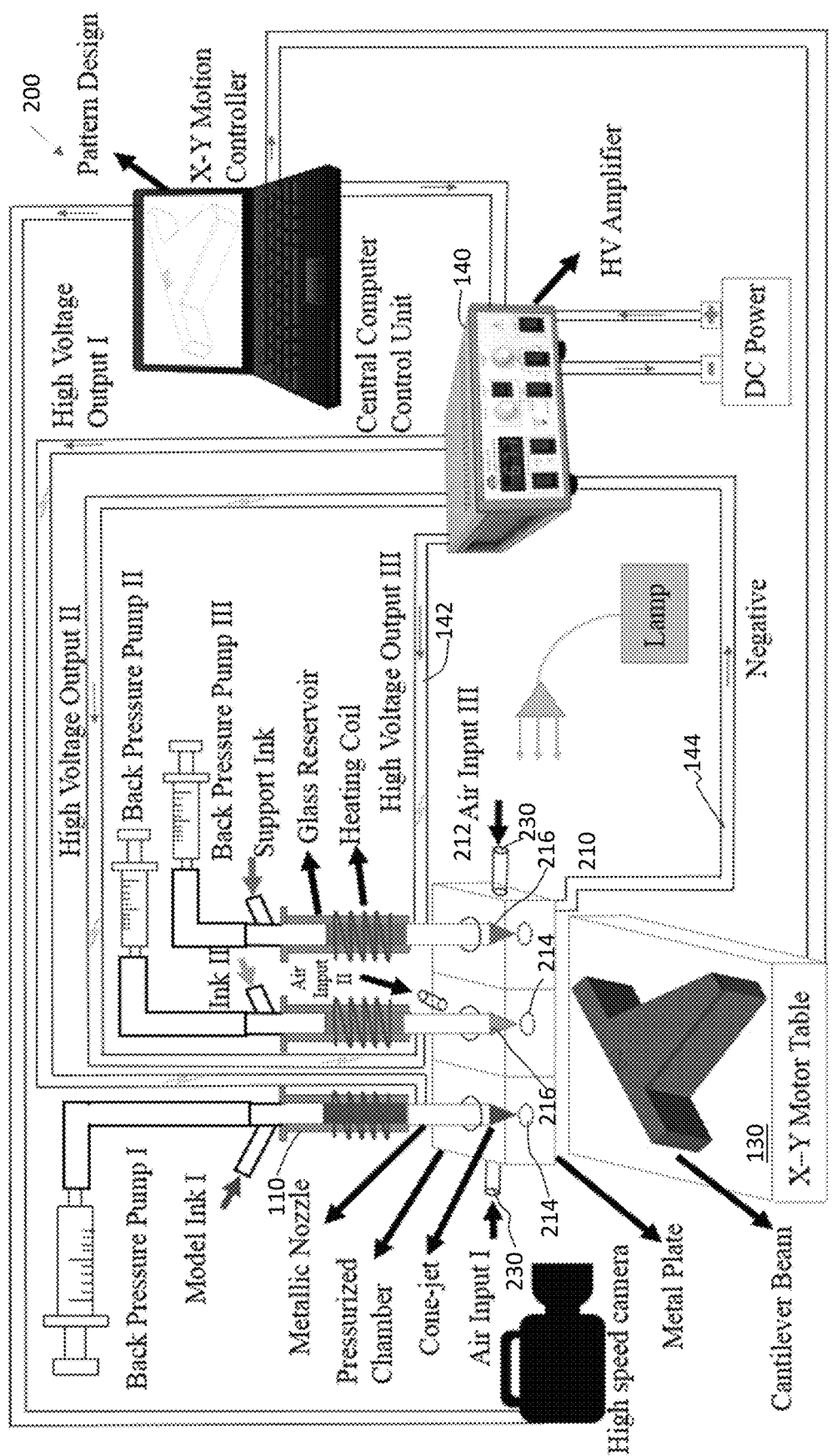
FIG. 13A is a graph of average droplet diameter (microns) vs. applied voltage at 90° C.
FIG. 13B is a graph of average droplet diameter (microns) vs. applied voltage at 100° C.
Figure 13B:
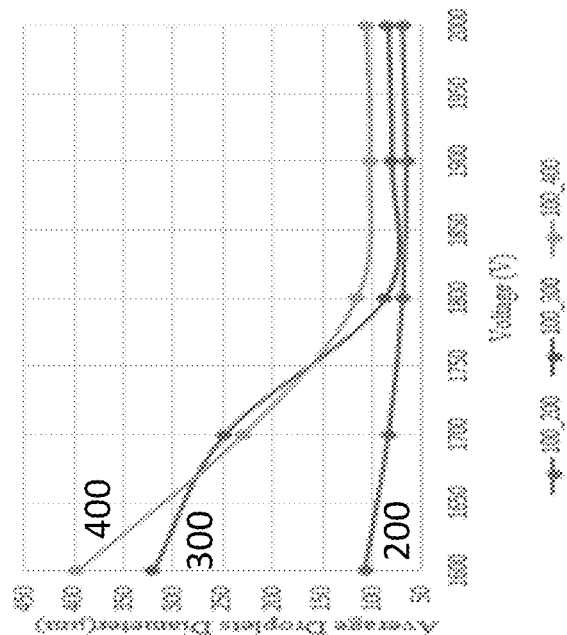
Figure 13A:
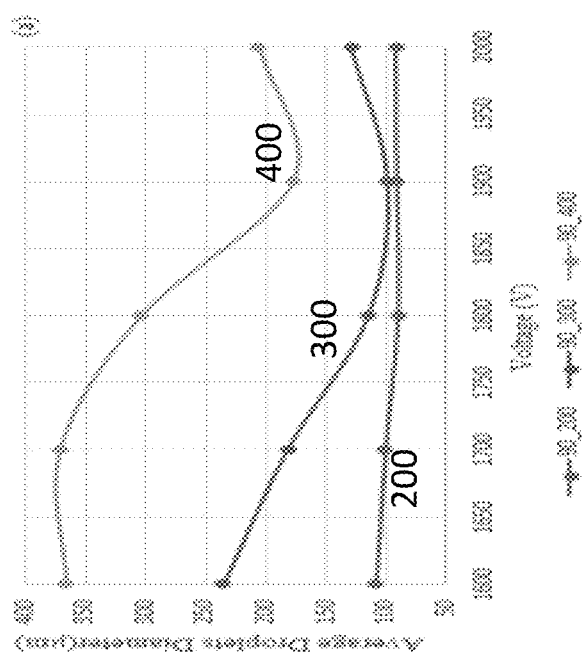

The melting point of wax is 40° C., and effects of temperature, voltage, and standoff distance on diameter of wax droplets were investigated by experiments and simulation. Each time one of parameters was changed, and the other parameters were kept same. Twenty dots on substrate were measured, and average value of their diameter were plotted in FIGS. 13A and 13B at 100° C. show that diameter of droplets decreased tremendously with increase of voltage, because printing mode transit from dripping, micro dripping to pulsating cone jet mode. When standoff distance is kept at 355 µm and voltage is maintained at 1.6 kV, strength of electric field is equal or larger than onset electric field for cone-jet formation. In this circumstance, diameter of droplets is slightly changed with increase of voltage. As standoff is changed from 400 units to 200 units (1 unit is approximately 1.775 microns), both FIG. 13A and FIG. 13B display that the diameter of droplets decreases with reduction of standoff distance. One conclusion can be drawn here is that size of droplet become smaller with decrease of standoff height or increase of voltage. In the pulsating cone jet mode, diameter of droplets slightly decreases with changes of voltage.

Figure 14:
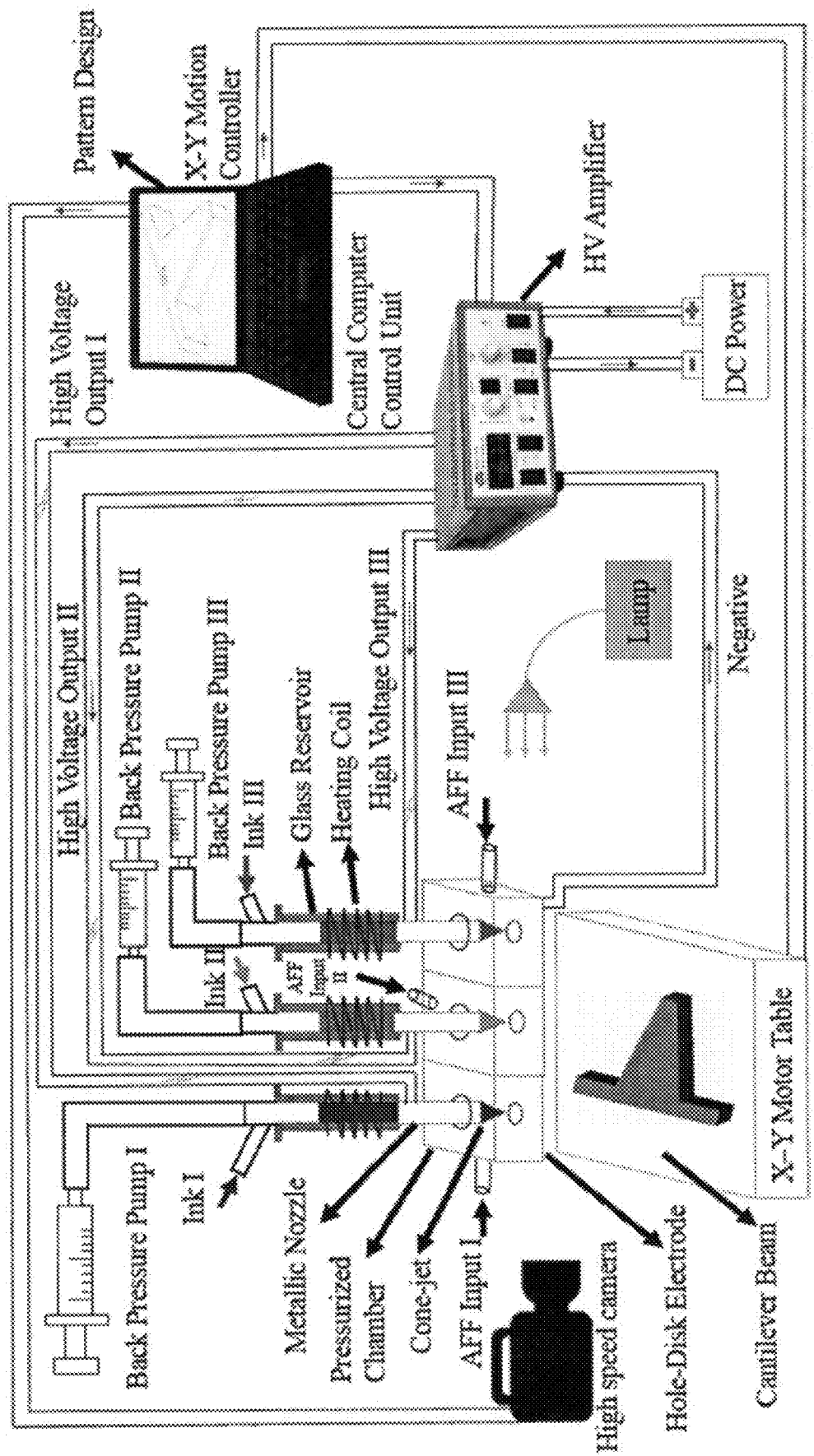
FIG. 14 is a schematic view of a multi-nozzle and multilayer EHD and AFF printing system according to an alternative exemplary embodiment of the present invention.
Figure 15:
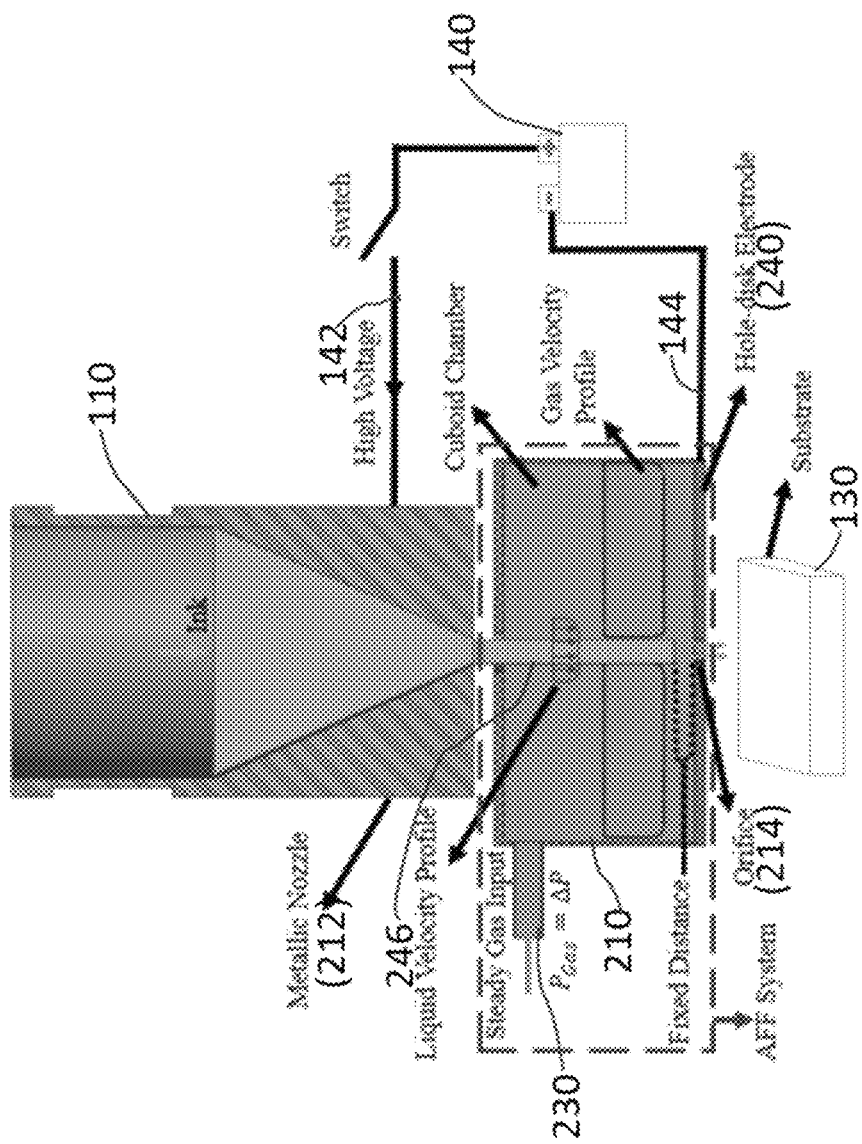
FIG. 15 is schematic sectional view of the nozzle and AFF chamber of the system of FIG. 14.
Figure 16:
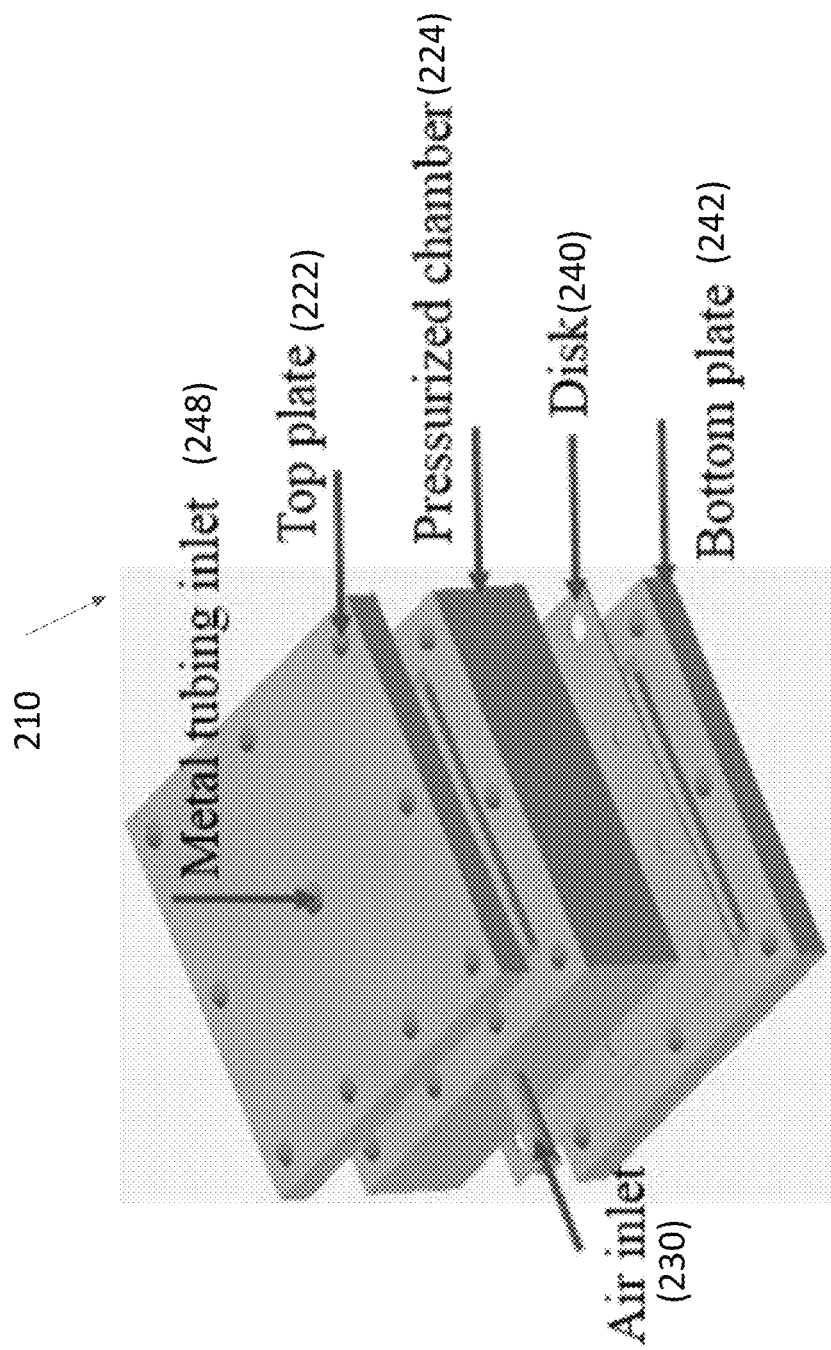
FIG. 16 is an exploded perspective view of an exemplary chamber used with the system of FIG. 14.

In an alternative embodiment, shown in FIGS. 14-16, an air focusing flowing ("AFF") feature is incorporated into an EHD printer system 100. While the EHD printing method described above offers a good solution for deposition of high viscosity materials in high resolution, its printing efficiency has hindered its application on widespread rapid prototyping. The main reason is that the size of droplet or jet exhibits a strong reliance on flow rate. The low Reynolds numbers are constrained by the requirement that the overall flow velocity does not grow above a threshold to ensure that inertial forces remain negligible. Furthermore, it can be difficult to print some materials that are insensitive to an electrical field at a given target droplet size by EHD. In order to overcome these challenges, a hierarchical printing process which includes both EHD and AFF is included in a nozzle assembly 200. In addition, a novel structure of a dispensing nozzle 212 (shown in FIG. 15) is provided to satisfy the requirement of hierarchical writing.

Subsequently, a new perspective was opened by the emergence of moderate-high Reynolds number air flow focusing method, as a high productivity complementary to low Reynolds number EHD printing system. Compared to other co-flowing techniques, flow focusing stands today as a mature microfluidic standard yielding capillary jet and the menisci take the form of a cusp-like drop attached to the feeding tube by co-flowing gas sheath in AFF system like the Taylor cone.

The structure of nozzle 212 shown in FIG. 15 is used to generate a continuous micro-jet by a co-flowing gas stream for freeform fabrication of objects at moderate-high speed rate. When the steady gas flow into a cuboid chamber 210 whose length is not much bigger than its width and the ink is fed in the vicinity of the orifice 214 by a nozzle 110 connected to a capillary tube 216, a small jet is issued through the orifice by 214 mechanical local suction operating, which overcomes surface tension that increases in inverse proportion to the jet diameter and a strongly convergent gas flow through the small orifice 214 defines the local conditions that strong pressure gradient at the exit orifice sustaining the emission of a steady micro-jet.

Once the micro-jet ejects from tip of meniscus and the surrounding gas stream which is flowing axially beyond the orifice 214 exit causes a strong shear force on the jet. An intact jet needs to be prevented from Rayleigh type or hydrodynamic instability by keeping the orifice 214 close to the collector plate 130.

Compared to traditional pressurized system, an aerodynamic gas stream is used to force ink through the exit orifice and exerting negligible viscous resistance, and thus solid contact is avoided. In addition, the stabilizing effect may originate from the positive shear stress caused on the surface of liquid by the much faster gas stream.

The steady jetting is essential to obtain a precisely controlled size and thus it is necessary to investigate the relationship between onset of steady jetting and working parameters including fluid velocity v and material properties (density $\rho$, viscosity $\mu$ and surface tension $\sigma$). The following dimensionless parameters, including Reynolds (Re), Weber (We), and Capillary (Ca) numbers characterize the jet's behavior, and they can be defined from the working parameter mentioned above.

$$Re = \rho v R_o / \mu$$

$$We = \rho v^2 R_o / \sigma$$

$$Ca = v \mu / \sigma$$

Where Reynolds number ("Re") is the ratio of inertia to viscous force, Weber number ("We") is the ratio of inertia to surface tension force and Capillary number ("Ca") is the ratio of viscous to surface tension. The study of dimensionless parameters will help to find optimal operating condition to reach the steady jetting.

In FIG. 15, the dual printing process that EHD and AFF printing method are effectively combined together to form system 200. First, both methods exhibit tapering shapes starting from a meniscus cone suspending at end of nozzle 212 and their printing capability are not limited by viscosity of ink due to unique forming mechanism of cone-jet. It shows that both of EHD and AFF are good candidates to handle high viscosity ink in precisely controllable scale. The EHD printing can obtain the bigger neck-down ratio than that acquired in AFF and EHD can be applied to printing with the precise features. AFF printing can deposit ink that is insensitive to electrical properties at high production rate. On the other hand, the EHD represents an accurate printing process. It is an immensely potential printing method to seamlessly integrate both methods together associated to their unique feature.

Optionally, a multi-nozzle deposition system (multiple reservoirs 110) can also be smoothly merged into the dual function printing system 200. Also, CAD software can be used to design different model and convert model file into lines of G-code to print customized structures.

The process of a dual print using system 200 of FIG. 14 is described below. If only EHD method is going to be used, electric potential supply 140 is turned on and pressurized air is not allowed to enter into chamber 210, and a strong electric field is formed between metallic nozzle 212 and substrate 130. Liquid is going to be pulled out from the nozzle 212 only by electric force.

If only AFF method is to be applied, electric potential supply 140 is turned off and electric field is removed from chamber 210. Then, pressurized gas come into the chamber 210 from gas supply 230 and force ink to form a cusp-like cone whose shape is similar to the Taylor cone that is formed by electric force. At the beginning of AFF print, a cone shape can be formed by flowing air at bottom end of nozzle 212 and then a liquid jet accompanying with the flowing air is ejected out of the orifice 214. In an exemplary embodiment, air pressure at about six pounds per square inch (gauge) was provided to chamber 210. The size of droplet formed by AFF is smaller than that of droplet in conventional printing method.

It is not possible for extrusion or laser-based 3D printer to deposit variable sizes of filaments having the same diameter of the nozzle or spot of laser. However, the EHD system is capable of using the same size of nozzle 212 with adjustable operating parameters, such as voltages, heating parameters and back pressure to print different sizes of droplets or jets. The models and supporting materials can be printed from different nozzles. The EHD printing system allows for flexibility and dependability in demonstrating 3D CAD models and deliver a virtual environment for users to achieve visualization and quality analysis of multi-material applications.

A printing head is provided to satisfy the requirement of building three dimensional structure by EHD method and it should not be a problem to deposit high viscosity material at micron resolution. As shown in FIG. 15, the cuboid chamber 210 is used to provide a stable printing method for deposition of multiple layers. The design integrated metallic nozzle (positive electrode) with a hole-disk electrode coaxially and the distance between two electrodes is fixed around 100 microns to eliminate limitation of height. This design benefits deposition of multiple layers at a constant field and it also helps us to build a robust 3D model. The metallic nozzle that is connected to reservoir of liquid was inserted through the small hole located at the middle of top plate of cuboid chamber 210, which can be constructed of aluminum to minimize weight of chamber 210.

Several considerations related to designing process are listed below. First, the selection of diameter of hole-disk electrode 240 was determined; a smaller diameter of orifice 214 gives rise to a higher intensity of electric field but more difficulty in making liquid jet pass through the small orifice 214 and vice versa. Second, intensity of the electric field also depends on the distance between two electrodes 142, 144 and the flow rate of the printing material. Since the electric field plays an important role in achieving the optimum operating condition and controlling stability of the jet of printing material, a finite element analysis (FEA) simulation software, called ANSYS multi-physics modeling software, was used to help us to understand distribution and strength of electric field.

As shown in FIG. 16, the assembly of cuboid chamber 210 has four parts and they are top plate 222, pressurized chamber 224, hole-disc 240, and bottom plate 242. In an exemplary embodiment, the dimension of top plate is 64 mm long by 64 mm wide and 5 mm thick. Top and bottom plates 222, 242 can be constructed from aluminum instead of stainless steel to reduce weight 246.

A metal capillary 246 is fed through a center hole 248 of top plate 222 such that chamber 210 is in fluid communication with the distal tip 212. The printing material vertically discharges from the distal tip 212 to the output orifice 214 for discharge from the air focusing flowing system. The distance between the capillary 246 and the hole-disk electrode 240 can be manually adjusted as desired. The hole-disk electrode 240 is stationary, so the distance can be only changed by altering position of the capillary 246.

In an alternative exemplary embodiment, the pressurized chamber 224 can be constructed from polycarbonate (PC), which is a good electrical insulator, and range of its working temperature is from 115 to 130° C.

EHD inkjet printing is a high resolution manufacturing method. In the second printing system 200, a constant height can be maintained between nozzle and top surface of substrate. In the initial setup of system 100 as shown in FIG. 1, a distance between nozzle 112 and substrate 130, also known as the standoff height, is changing with the increased layer number of three-dimensional structures. Electrical voltage need to be changed layer-by-layer to keep a constant electric field, and an unpractical high potential may be required by a large standoff height. In order to solve this problem, printing head with integrated hole-disk electrode 240 was designed as shown in FIG. 15, and this design can effectively mitigate standoff limitation. In the new design, important parameters include the distance between nozzle 212 and hole-disk electrode 240, diameter of orifice 214, and thickness of hole-disk electrode 240.

In an exemplary embodiment, phase-change material (paraffin wax, and PCL pellets) was selected to study effects of operating parameters, including electrical voltage, melting temperature, plotting speed, nozzle diameter, diameter of orifice 214, and distance between nozzle 212 and hole-disk electrode 240.

In experiments of AFF, air flow was delivered from pressurized pump to air-tight printing chamber, and electric voltage was not applied to metal nozzle in experiments for AFF. Air pressure was set to 6 pounds per square inch (gauge) by pressure regulator, and water was delivered to the tip of nozzle by syringe pump.

The doctoral thesis of inventor Dajing Gao, entitled "High Resolution Electrohydrodynamic 3D Printing for High Viscosity Materials" is incorporated herein by reference in its entirety.

It will be further understood that various changes in the details, materials, and arrangements of the parts which have been described and illustrated in order to explain the nature of this invention may be made by those skilled in the art without departing from the scope of the invention as expressed in the following claims.

We claim:
1. An electrohydrodynamic printing system comprising:
 a reservoir having a discharge nozzle, the discharge nozzle having a distal tip;
 a heating coil disposed proximate to the discharge nozzle, the heating coil being configured to heat the reservoir proximate to the discharge nozzle;
 a collector plate located vertically below the distal tip a distance of not more than 1.5 mm; and
 a single hole-disk electrode between the nozzle and the collector plate;
 an electric potential supply having a first electrode electrically connected to the discharge nozzle and having a positive polarity, a second electrode electrically connected to the collector plate and having a negative polarity, and a third electrode electrically connected to the hole-disk electrode and having the negative polarity;
 wherein the distal tip discharges print material from the reservoir, the print material having a width of less than 10 microns.

2. The electrohydrodynamic printing system according to claim 1, wherein the reservoir consists of a gravity feed.

3. The electrohydrodynamic printing system according to claim 1, wherein the electric potential supply generates an electric field at the discharge nozzle to discharge printing material from the reservoir, through the discharge nozzle, and to the collector plate.

4. The electrohydrodynamic printing system according to claim 1, further comprising an air focusing flowing system disposed proximate to the distal tip.

5. The electrohydrodynamic printing system according to claim 4, wherein the air focusing flowing system comprises a chamber in fluid communication with the distal tip, such that printing material from the reservoir flows through the distal tip and into the chamber, the chamber further comprising a pressurized gas input.

6. The electrohydrodynamic printing system according to claim 5, wherein the chamber comprises an output orifice disposed vertically below the distal tip, such that the printing material vertically discharges from the distal tip to the output orifice for discharge from the air focusing flowing system.

7. A method of electrohydrodynamic printing comprising the steps of:
 (a) providing the system according to claim 4;
 (b) adding a printing material to the reservoir;
 (c) selecting one of the electric potential supply to supply the electric potential and the air focusing flowing system to supply pressurized gas to the chamber;
 (d) using the selection from step (c) to discharge the printing material from the distal tip to the collection plate.

8. The method according to claim 7, wherein step (c) comprises also selecting the other of the electric potential supply to supply the electric potential and the air focusing flowing system to supply pressurized gas to the chamber.

9. The method according to claim 7, wherein step (d) comprises forming a line of printing material having a width of less than 10 microns.

10. The method according to claim 7, wherein step (b) comprises providing the printing material in the absence of a solution.

11. The method according to claim 7, further comprising, prior to step (d), the step of heating the printing material in the reservoir.

12. The method according to claim 11, wherein the step of heating the printing material in the reservoir comprises melting the printing material.

13. A method of electrohydrodynamic printing comprising the steps of:
(a) providing the system according to claim 1;
(b) adding a printing material to the reservoir, the printing material being a polymer such that the polymer is not diluted in solution; and
(c) applying not more than about 2kV across the first electrode and the second electrode,
thereby discharging the printing material from the nozzle to the collector plate.

14. The method according to claim 13, further comprising, after step (a), heating the nozzle.

15. The method according to claim 13, wherein step (c) comprises forming a line of printing material having a width of less than 10 microns.

16. The method according to claim 13, wherein the polymer comprises polycaprolactone or polylactic acid.

17. The electrohydrodynamic printing system according to claim 1, wherein an electrical potential generated by the electric potential supply is less than 2 kV.

18. The electrohydrodynamic printing system according to claim 5, wherein the chamber further comprises an orifice downstream of the distal tip.

19. An electrohydrodynamic printing system comprising:
a reservoir having a discharge nozzle, the discharge nozzle having a distal tip;
a heating coil disposed proximate to the discharge nozzle, the heating coil being configured to heat the reservoir proximate to the discharge nozzle; a collector plate located vertically below the distal tip a distance of not more than 1.5 mm;
an electric potential supply having a first electrode electrically connected to the discharge nozzle and a second electrode electrically connected to the collector plate; and
an air focusing flowing system disposed proximate to the distal tip,
wherein the air focusing flowing system comprises a chamber in fluid communication with the distal tip, such that printing material from the reservoir flows through the distal tip and into the chamber, the chamber further comprising a pressurized gas input;
wherein an electrical potential generated by the electric potential supply is less than 2 kV; and
wherein the pressurized gas input is configured to provide pressurized air to the chamber at a pressure of less than about six pounds per square inch (gauge).

* * * * *